United States Patent [19]

Wang et al.

[11] Patent Number: 5,187,796
[45] Date of Patent: * Feb. 16, 1993

[54] THREE-DIMENSIONAL VECTOR CO-PROCESSOR HAVING I, J, AND K REGISTER FILES AND I, J, AND K EXECUTION UNITS

[75] Inventors: Yulun Wang; Partha Srinivasan, both of Goleta, Calif.

[73] Assignee: Computer Motion, Inc., Goleta, Calif.

[ * ] Notice: The portion of the term of this patent subsequent to May 28, 2008 has been disclaimed.

[21] Appl. No.: 553,884

[22] Filed: Jul. 16, 1990

Related U.S. Application Data

[63] Continuation-in-part of Ser. No. 174,653, Mar. 29, 1988, Pat. No. 5,019,968.

[51] Int. Cl.[5] ............................. G06F 15/347
[52] U.S. Cl. ........................... 395/800; 395/200; 364/920.8; 364/926.2; 364/931.51; 364/937.7; 364/942; 364/DIG. 2; 364/736
[58] Field of Search ............... 395/800, 200; 364/736

[56] References Cited

U.S. PATENT DOCUMENTS

| | | | |
|---|---|---|---|
| 4,128,880 | 12/1978 | Cray, Jr. ............................ | 364/200 |
| 4,633,389 | 12/1986 | Tanaka et al. .................... | 364/200 |
| 4,635,292 | 1/1987 | Mori et al. ........................ | 382/41 |
| 4,852,083 | 7/1989 | Niehaus et al. ................... | 370/58 |
| 4,945,479 | 7/1990 | Rusterholz et al. .............. | 364/200 |
| 5,019,968 | 5/1991 | Wang et al. ....................... | 364/200 |
| 5,109,499 | 4/1992 | Inagami et al. ................... | 395/425 |
| 5,123,095 | 6/1992 | Papadopoulos et al. ......... | 395/375 |

Primary Examiner—Thomas C. Lee
Assistant Examiner—William M. Treat
Attorney, Agent, or Firm—Blakely Sokoloff Taylor & Zafman

[57] ABSTRACT

The present invention is a three-dimensional vector co-processing system (3DVCP) including the datapath of a three-dimensional vector co-processor having a register-to-register architecture and being coupled to a general-purpose processor. The source multiplexer and the destination multiplexer of the co-processor uses full cross-bar switches. As such, the three-dimensional co-processor evaluates three-dimensional vectors and scalars while the general-purpose processor performs the other "general purpose" functions. The 3DVCP includes a co-processor interface for synchronizing the three-dimensional vector co-processor and the general-purpose processor. With this interface, the general-purpose processor controls the address bus and control lines of the data bus. The three-dimensional vector co-processor also has an instruction set that enables the control unit to pipeline the program instructions in stages in addition to instruction fetch, fetch instruction, instruction execute, and store-result. The 3DVCP specifically targets vectors of length 3, and expoits the intrinsic parallelism by providing three parallel execution units that can simultaneously operate on all three vector components. Scalar processing does not suffer with this parallel execution approach, whereas it does with a pipelined approach. The execution units are used individually for scalar operations.

19 Claims, 17 Drawing Sheets

AW - OPERAND RETURN ADDRESS
ARa - PORT a READ ADDRESS
ARb - PORT b READ ADDRESS
osb - CORDIC OUTPUT SELECTION
osa - BROADCAST BUFFER SELECTION

CLOCK CYCLES

| | | 0 | 1 | 2 | 3 | 4 | 5 | 6 | 7 | 8 | 9 |
|---|---|---|---|---|---|---|---|---|---|---|---|
| 720<br>lwc2 | 3DCP | IFetch | Reg_Rd | 3D_alu | Mem | Excep | Reg_wr | | | | |
| 725 | GP | IF | RD | ALU | MEM | WB | | | | | |
| FADD | 3DCP | | IFetch | Reg_Rd | 3D_alu | Mem | Excep | Reg_wr | | | |
| | GP | | IF | RD | ALU | MEM | WB | | | | |
| 730<br>add | 3DCP | | | IFetch | Reg_Rd | 3D_alu | Mem | Excep | Reg_wr | | |
| | GP | | | IF | RD | ALU | MEM | WB | | | |
| 735<br>FRMULR | 3DCP | | | | IFetch | Reg_Rd | 3D_alu | Mem | Excep | Reg_wr | |
| | GP | | | | IF | RD | ALU | MEM | WB | | |
| 740<br>lwc2 | 3DCP | | | | | IFetch | Reg_Rd | 3D_alu | Mem | Excep | Reg_wr |
| | GP | | | | | IF | RD | ALU | MEM | WB | |

 lwc2 - load word into co-processor

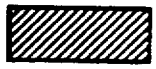 FADD - add two vectors in the co-processor

 add - add two registers in the general-purpose processor

 FRMULR - multiply two vector registers in the co-processor with the pre and post rotation to the Right.

 lwc2 - load word into co-processor

Fig. 21B

THREE-DIMENSIONAL VECTOR CO-PROCESSOR HAVING I, J, AND K REGISTER FILES AND I, J, AND K EXECUTION UNITS

BACKGROUND OF THE INVENTION

1. Related Application

The present application is a continuation-in-part of the U.S. patent application Ser. No. 07/174,653, filed Mar. 29, 1988, now U.S. Pat. No. 5,019,968.

2. Field of the Invention

The present invention is a three-dimensional vector co-processing system (3DVCP) including a three-dimensional vector co-processor coupled to a general-purpose processor for performing three-dimensional vectors and scalars calculations required for applications such as simulation, modeling, real-time control and others.

3. Background of the Invention

There is a large class of problems which share a common 3-D numerical structure. In general, this 3-D characteristic is intrinsic to problems which deal with representing and/or manipulating objects in the physical world. A few such examples are dynamic simulation (e.g. automobile suspension modeling, flight simulation), animation, molecular modeling, 3-D graphics, and robot motion control.

This 3-D quality is intrinsic to algorithms which explain the physics of the real-world since they are derived from fundamental relationships between 3-D vector quantities such as position, velocity, acceleration, force and moment. Even through the final algorithmic expressions can be very complicated, ultimately they can be decomposed into a few fundamental kinematic and dynamic laws. This 3-D characteristic is embedded in many applications areas. For example, a robot manipulator is a system of constrained rigid bodies, and advanced control methods take into account the dynamic behavior of the rigid body system with the constraints imposed by the mechanism's geometry. Another quickly growing area is dynamic simulation. Predicting the behavior of a physical system with computers has become a necessary tool for a wide range of applications. A mathematical model of the simulated system is programmed, and the model is used to predict system behavior under different user inputs. The mathematical model is predominantly composed of 3-D vectors since it involves the manipulation of quantities like position, velocity, and force. Simulating a mechanical system, such as a rocket or robot, lets the engineer quickly analyze the performance of the system before building it. A rocket simulation lets the engineer see the effects of changing parameters such as booster thrust and trajectory profiles without costly real-world experiments, for example.

An "interactive" simulator is one which accepts external input during a simulation and adjust the system accordingly. A flight simulator is an example of an interactive simulator where the pilot interacts with the system using various controls and the simulator must respond to the pilot's actions immediately. Flight simulators have saved millions of dollars in operating expenses for training pilots. Interactive simulators impose a more stringent real-time constraint on the computer than non-interactive simulators because the computer must analyze the new input and update the simulation fast enough to achieve the desired real-time effect. For example, the computer for a flight simulator must update its model fast enough to convince the operator that he is actually controlling an airplane. Video games comprise another area where interactive simulation can be applied.

Rocket control simulation is a 3-D vector problem which is not interactive. However, the simulation may require real-time performance. The key problem to rocket simulation can be stated as follows: given a trajectory with a beginning point, an end point, and the path between them, compute the thrust vectors that will achieve the desire trajectory. The input to the problem consists of actual physical data from inertial guidance symbols, velocity sensors, acceleration sensors, and tables which give information on fuel consumption. Often the simulation is performed with actual hardware components from the rocket (e.g. thrusters and actuators) integrated with the simulation model stored on the computer. In order to correctly control the actual hardware, real-time responses are necessary.

Natural animation, is a field closely related to dynamic simulation from a computational point of view; in both cases a mathematical model of a physical system is calculated by the computer. See Wilheim, J., "Towards Automatic Motion Control", *IEEE Computer Graphics and Applications*, April 1987, pp. 11-22. Natural animation is different from dynamic simulation in the sense that the animator creates a computer visualization for the purpose of telling a story or creating an artistic effect. A dynamic simulation replicates a system for the purpose of analysis. By incorporating the dynamic model into the animation, the animator can move the objects about more easily since the physical constraints of the system will be automatically maintained by the computer.

For a computer to manipulate objects in a realistic manner, it must solve the equations of motion of the physical system. The computational complexity of the equations of motion of a dynamically coupled system quickly becomes very significant as the system grow in complexity. Researchers have improved the calculation speed of equations of motion by formulating the problem for multiprocessor evaluation and using multiple general purpose processors for real-time execution. Please refer to Barhen, J., Halbert, E. C., and Einstein, J. R., "Advances in Concurrent Computation for Autonomous Robots", *Proc. of the Robotics Research Conf.*, Scottsdale, Ariz., August 1986; Lee, C. S. G., and Chang, P. R., "Efficient Parallel Algorithm for Robot Inverse Dynamics Computation", *Proc. on Robotics and Automation*, San Francisco, Calif. 1986. However, if the system is kinematically linked, or dynamically coupled, such as is often the case in mechanical systems (e.g. robot manipulators), this approach yields inadequate results. Kinematic dynamic equations for a dynamic system are often very tightly coupled and thus do not lend themselves to parallel processing. By exploiting the parallelism of the problem of the 3-D vector level, much better performance is obtained. Parallel processing techniques can then be applied to dynamically less coupled systems. In such cases, multiple 3-D vector processors could be used.

Many different processor architectures have been developed to solve today's computational problems. New architectures are sometimes developed specifically for a single problem. However, "general-purpose" processors are most prevalent since they can be applied to a wide range of applications. The computational requirements for data-base management and scientific computations are very different in structure. A general-purpose architecture can handle both problems with an acceptable degree of efficiency. The reason such architectures are predominant throughout the computer industry is that general purpose designs can be applied to a wide range of applications and therefore the energy required to design and fabricate these devices can be justified by semiconductor manufacturers.

General purpose architectures sacrifice flexibility. They are not targeted to any particular class of problems. For example, in many mathematical calculations the fundamental unit is a scalar, and general purpose designs are optimized for scalar computations. Other features like hardware support for instruction look-ahead, caching, and context switching are used to improve processing speed and/or throughput.

If a class of problems with a common structural characteristic is identified, and this class of problems encompasses enough applications, a specialized processor architecture may be justified. The evolution of digital signal processors (DSPs) offers such an example. More and more signal processing applications were identified where fast digital computations would be useful. DSPs were developed to exploit the successive multiply/accumulate nature of signal processing with direct hardware support. Furthermore, once DSPs were created, they were immediately found to be useful in other application areas, for example in robotics. Please see Wang, Y., and Butner, S., "RIPS: A Platform for Experimental Real-Time Sensory-based Robot Control", *IEEE Transactions on Systems, Man, and Cybernetics*, Vol 19, No. 4, July/August 1989; Takanashi, N., Ikeda, T., and Tagawa, N., "A High-Sampling Rate Robot Control System Using a DSP Based Numerical Calculations Engine", *Proc. of the IEEE Conf. on Robotics and Automation*, Scottsdale, Ariz., 1989.

Vector architectures form the basis for a class of computers which have been developed for scientific applications. Finite element analysis, solving partial differential equations, and numerical linear algebra are a few of the application areas which rely on fast vector processing. Today's supercomputers attack these highly vectorizable problems with extensively pipelined execution units. In order for vector architectures to work efficiently, they rely on a relatively long vector length (e.g. >12). Refer to Cheng, H., "Vector Pipelining, Chaining, and Speed on the IBM 3090 and Cray X-MP", *IEEE Computer*, September 1989.

There is a large class of problems which share a common 3-D numerical structure (i.e. vectors of length 3). The short vector length prevents fast execution on typical vector architectures because of their long pipeline. In a general sense, the 3-D characteristic is intrinsic to problems which deal with representing and/or manipulating objects in the physical world. The mathematics used to represent and predict the behavior of real-world objects is derived from a few fundamental kinematic and dynamic properties. These equations explain relationships between physical quantities such as forces, moments, positions, velocities, and accelerations. A few of the frequently used equations are listed below.

$$v = \omega \times R$$

$$A_n = \omega \times (\omega \times R)$$

$$A_t = \alpha \times R$$

$$F = mA$$

$$M = I\alpha$$

where:
v—linear velocity vector
$\omega$—angular velocity vector
$A_n$—normal acceleration vector
$A_t$—tangent acceleration vector
R—radius vector
F—force vector
M—moment vector
$\alpha$—angular acceleration vector
I—inertia tensor (3-by-3 matrix)
m—mass (scalar)

Standard vector processors assume vectors of varying lengths and use multi-staged pipelines, which have long latencies, to achieve high speed execution. Refer to Cheng, H., "Vector Pipelining, Chaining, and Speed on the IBM 3090 and Cray X-MP", *IEEE Computer*, September 1989. This approach works well provided that the vector lengths are longer than the number of pipeline stages so that the time required to fill the pipeline is an acceptable overhead. The short vector length of the three-dimensional operations limits the throughput of the multi-staged approach because of the large pipeline latency. The 3DVCP of the second embodiment of the present invention specifically targets vectors of length 3, and exploits the intrinsic parallelism by providing three parallel execution units that operates simultaneously on all three vector components. Scalar processing does not suffer with this parallel execution approach, whereas it does with a pipelined approach. The execution units are used individually for scalar operations. This architecture supports 3-D vector operations, scalar operations, and 3-D vector-scalar operations with a high degree of efficiency.

This invention describes a parallel computing architecture which differs from traditional scalar architectures in that it operates directly on vectors, from general parallel architectures in that it excels in solving highly coupled systems, and from vector architectures in that it runs efficiently on vectors of length 3. This co-processor design accelerates computations involving 3-D vectors yet allows a general-purpose processor coupled to it to proceed with the more "general-purpose" processing activities, such as operating system support, virtual memory support, caching, logical and arithmetic functions, etc. The resulting design increases several times the overall speed of executing 3-D algorithms.

SUMMARY OF THE INVENTION

The present invention includes a processor designed to receive and execute a series of instructions provided from a memory, for carrying out vector/vector, and scalar/vector arithmetic operation on three-dimensional vectors and scalar/scalar arithmetic operations. The processor includes a data-transfer input for receiving the series of program instructions and data from the memory, and a three-wide, register-to-register architecture for parallel processing of three operands. The three-wide architecture is made up a (a) I, J, and K register files, each containing a plurality of registers for storing scalar values or individual vector components of three-dimensional vectors, (b) I, J, and K execution units for performing arithmetic operations on operands placed in the execution units, (c) I, J, and K operand pathways connecting each I, J, and K register file, respectively, with the corresponding I, J, and K execution unit, and (d) multiplexed buses for returning the results of the execution units to selected register locations.

In the first embodiment of the present invention, a pair of broadcast buffers in the processor connect different pairs of operand pathways, for exchanging operands between the two pathways in each pair, in response to pathway exchange commands carried in the program instructions.

A data-transfer output passes selected operands from the processor to the memory, in response to write-to-memory commands carried in the program memory. Program instruction flow to the elements of the processor is controlled by a program evaluation unit which passes commands in the program instructions to the register files, the execution units, the broadcast buffers, the multiplexed data buses, and the data-transfer input and output. In a related embodiment, the processor includes the memory, preferably as individual program and data memory.

In the first embodiment of the invention, the processor further includes a CORDIC algorithm successive-add unit which implements two-dimensional coordinate rotations, using operands obtained from the three register files. The unit includes latches for storing the output values of the algorithm operation performed by the unite until the values are transferred as operands to selected execution units.

The program instructions are preferably pipelined from the program evaluation unit in fetch instruction, execute, and store-result stages.

The second embodiment of the present invention is a three-dimensional vector co-processing system (3DVCP) including the datapath of the three-dimensional vector processor described in the first embodiment of the present invention and being coupled to a general-purpose processor. The source multiplexer and the destination multiplexer of the co-processor uses full cross-bar switches. As such, the three-dimensional co-processor evaluates three-dimensional vectors and scalars while the general-purpose processor performs the other "general purpose" functions. The 3DVCP includes a co-processor interface for synchronizing the three-dimensional vector co-processor and the general-purpose processor. With this interface, the general-purpose processor controls the address bus and control lines of the data bus. The three-dimensional vector co-processor also has an instruction set that enables the control unit to pipeline the program instructions in stage in addition to instruction fetch, operand fetch, instruction execute, and store-result.

Standard vector processors assume vectors of varying lengths and use multi-staged pipelines, which have long latencies, to achieve high speed execution. Refer to Cheng, H., "Vector Pipelining, Changing, and Speed on the IBM 3090 and Cray X-MP", IEEE Computer, September 1989. This approach works well provided that the vector lengths are longer than the number of pipeline stages so that the time required to fill the pipeline is an acceptable overhead. The short vector length of the three-dimensional operations limits the throughput of the multi-staged approach because of the large pipeline latency. The 3DVCP specifically targets vectors of length 3, and exploits the intrinsic parallelism by providing three parallel execution units that can simultaneously operate on all three vector components. Scalar processing does not suffer with this parallel execution approach, whereas it does with a pipelined approach. The execution units are used individually for scalar operations. This architecture supports 3-D vector operations, scalar operations, and 3-D vector-scalar operations with a high degree of efficiency. Furthermore, this processing organization facilitates the generation of efficient code via good compilation.

BRIEF DESCRIPTION OF THE DRAWINGS

FIG. 21B is a timing diagram illustrating the instruction execution and stage occupancy for the three-dimensional vector co-processor and a general-purpose processor in the second embodiment of the present invention.

DETAILED DESCRIPTION OF THE INVENTION THE FIRST EMBODIMENT

Figure 1:
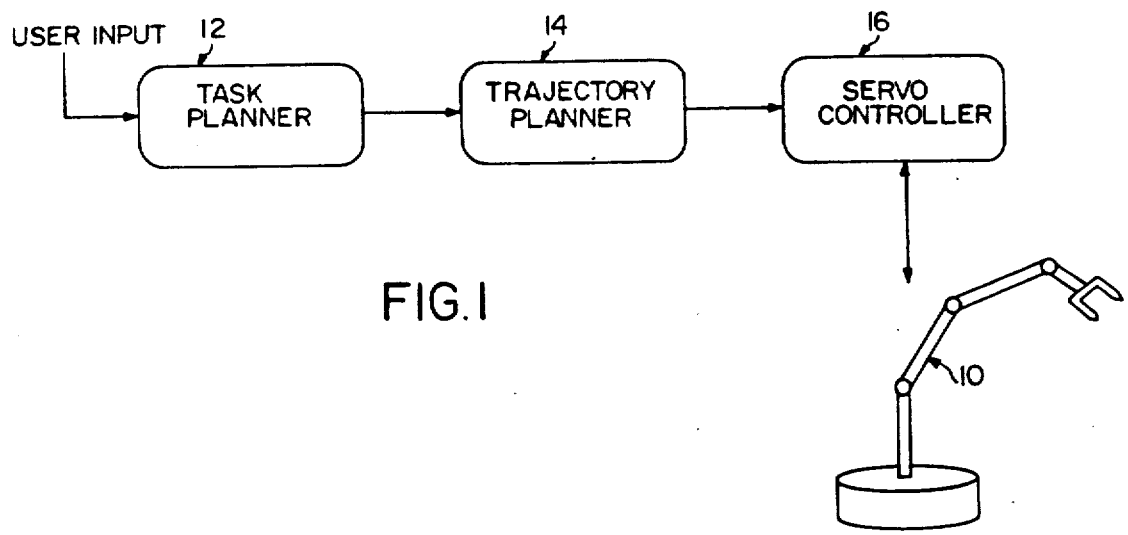
FIG. 1 shows the hierarchy of control levels in a system for determining the motion of a robotic arm.

FIGS. 1-15, Appendices A-C described the first embodiment of the present invention. FIG. 1 shows a hierarchy of control algorithms used in controlling the motion of a robotic arm 10. The motion of the arm is controlled by a series of actuators which are governed by the control algorithms to carry out desired arm movements. A task planner 12 accepts high-level user input, such as typed or voice commands, and from the task presented, determines start and end positions, e.g., the initial position and final desired position of an end-effector on the arm. A trajectory planner 14 uses the task planner output to determine the locus of points through which the robotic arm advances in moving from initial to final positions. A servo-controller 16 uses the locus of points provided by the trajectory planner and from inverse kinematics and inverse dynamics calculations, plus control law evaluation, calculates the torques which must be applied to the robotic arm actuators to move the arm through the locus of trajectory point to the desired final position.

As will be seen below, and according to an important feature of the invention, the novel processor of the invention can carry out the inverse dynamics and kinematics calculations required for determining actuator torque values in much less than 1 msec, allowing the motion of the robotic arm to be updated very millisecond, with additional program operations to be carried out between the servoing calculations. This feature allows real-time calculations of actuator inputs, at an update rate of about 1,000 times per second.

Figure 2:
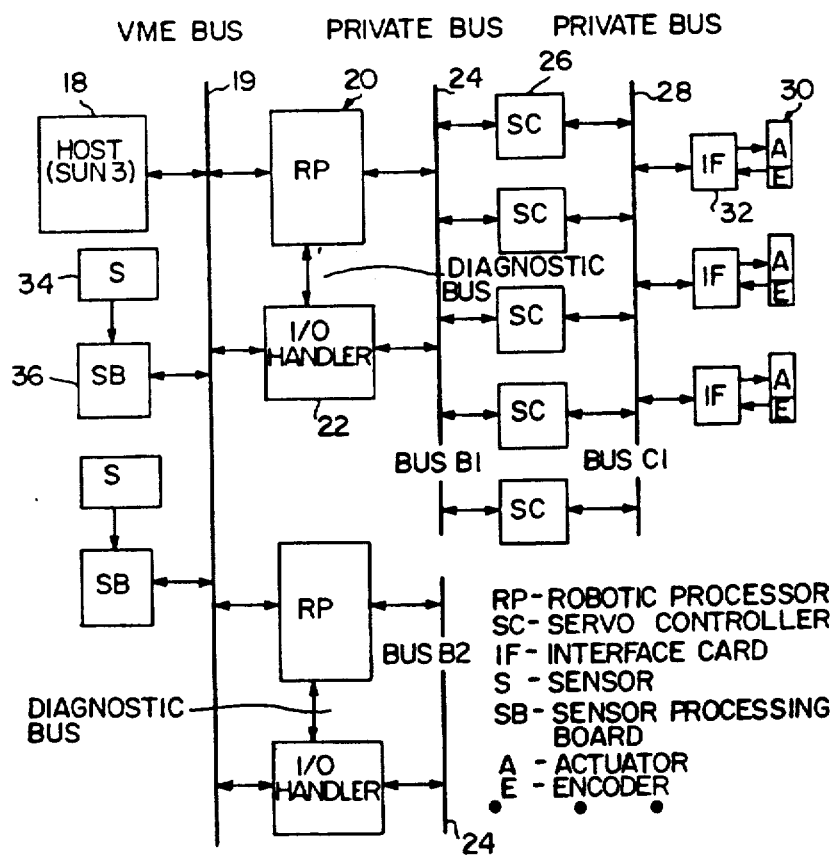
FIG. 2 is a block diagram of a robotics control system employing the robotics processor of the present invention.

FIG. 2 shows the system level architecture of a robotics instruction processor system employing the processor of the present invention. A host 18 provides the user interface to the system, as exemplified, for example, by a SUN/3 host operating under a UNIX system. The host communicates through a VME bus 19 with a processor (RP) 20 constructed according to the present invention, and detailed below. The system also includes an input/output handler 22 which functions to transfer data between the different processors in the system, as indicated. It also serves as the system synchronizer. The processor and I/O handler communicate through a private bus 24 with one or more servo-controllers (SC), such as controller 26. The servo controllers, which provide the servoing capabilities in the system, use a second private bus 28 to drive the manipulator actuators, such as actuator 30. Interface cards, such as card 32, perform the digital-to-analog and analog-to-digital translations needed to represent data in the needed format. The servoing motion executed by the system is monitored by sensors, such as sensor 34, which communicate with the processors in the system through sensor processing boards, such as board 36, as indicated.

In terms of hierarchy scheme shown in FIG. 1, the task planner 12 resides on host 18 in FIG. 2, and the trajectory planner and servo controller algorithms are carried out by processor 20. The servo controller also includes the I/O handler, servo controllers and interface cards needed for instructing the actuators in the robotics arm, and the sensory processing board for interfacing sensory information with the robotics processes. The actuators and sensors in FIG. 2 are, of course, part of the robotics arm.

A. Three-Wide, Register-to-Register Architecture

The processor of the present invention, i.e., processor 20 in FIG. 2 above, is designed to efficiently perform a variety of vector/vector operations, such as vector addition and vector cross product operations, and scalar/vector operations, such as scalar/vector and matrix/vector multiply operation. More generally, as will be seen below, the processor is designed for rapid vector/vector and vector/scalar operations involving three-dimensional vectors, and scalar/scalar arithmetic operations.

As discussed above, kinematic and dynamic equations required for robotics actuator control can be efficiently formulated into three-dimensional vector equations. In fact, any rigid body dynamic problem can be express in three-dimensional vector notation. An intuitive reason can be given of the 3-D structure of these equations. Kinematic and dynamic equations provide mathematical expressions which explain the motion of three-dimensional rigid bodies in a three-dimensional space. Quantities like positions, velocities, accelerations, forces, and moments are conveniently described by 3-D vectors.

A good example of an algorithm expressed in 3-D vector notation is illustrated by the recursive formulation of the Newton-Euler's inverse dynamic equations. This formulation is presently the most efficient method for solving the inverse dynamic problem of a manipulator. The 3-D notation has been taken one step further by extending the recursive formulation of the inverse dynamic equations into an algorithm for evaluating the Resolved Acceleration control method. This formulation is extremely efficient because it eliminates the redundant calculations required for both the kinematic and dynamic evaluation.

Figure 3:
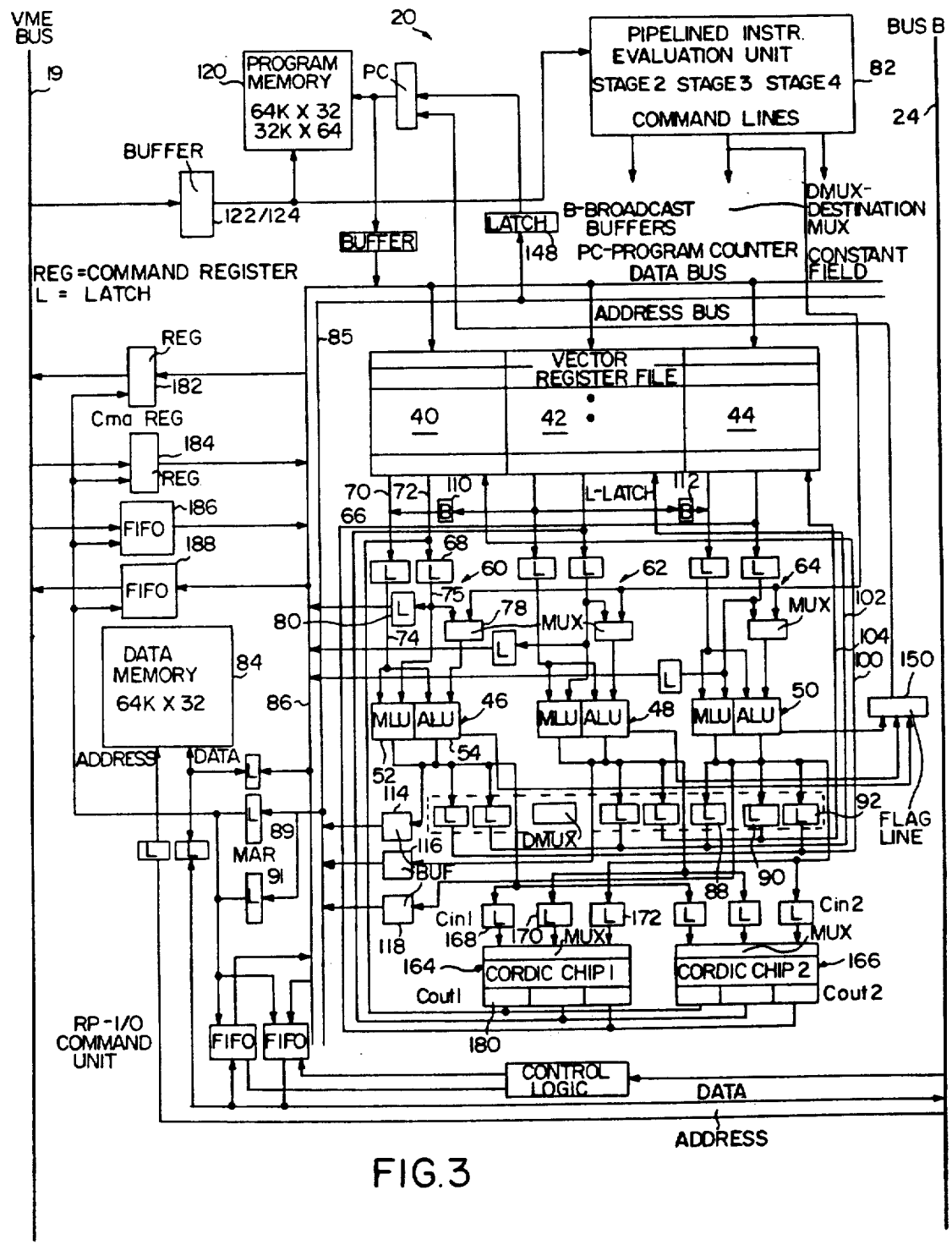
FIG. 3 is a block diagram of the processor of the present invention.

FIG. 3 is a block diagram of processor 20. The figure shows the VME bus 19 and private bus (bus B) 24 used in communications between the processor and other components of the robotics system shown in FIG. 2. Both buses, as well as other buses describe herein, are preferably 32-bit buses.

An important feature of the processor is a three-component wide data path which facilitates fast and efficient three-dimensional geometric operations. The data path originates and ends with three register files 40, 42, 44, which are also referred to as I, J, and K register files, respectively. These files store the scalar values for the three components, such as the i, j, and k, components of three dimensional vectors. The instruction set is organized such that any vector register can be accessed as a single entity, such as A, or components of a vector register can be individually accessed, such as A.i (the ith component of the vector register A). In one specific embodiment of the processor, each 32-bit register file is created from two 16-bit AMD 29334 four-port dual-access register file chips, which makes a total of 64 3-D vector registers.

A large number of registers (such as 64) allows the programmer to maintain all of the commonly accessed variables simultaneously in the register file. Since internal processor registers provide the fastest storage media, providing many of these registers facilitates high-speed execution. In other words, data stored in internal registers can be accessed faster than data stored in primary memory, hence it is advantageous to store the data in the registers. In the specific processor being described, the number of registers was basically dictated by the size of the AMD 29334, and not by any optimum number. Such a number many be calculable from the robot control servoing algorithms which are used.

As part of the three-wide architecture, the processor includes I, J, and K execution unit 46, 48, 50 respectively, for performing arithmetic and logical operations. Unit 46, which is representative, is composed of a multiplier unit (MLU) 52, and an arithmetic logic unit (ALU) 54. The specific processor being described uses an AMD 29C323 32-bit MLU and an AMD 29332 32-bit ALU for each of its three execution units. Each chip is packaged in a 168-pin PGA to provide enough pins to support two dedicated 32-bit input buses and one 32-bit output bus. This facilitates a fast flow-through execution because no staging of input and output operands is necessary. Since the multiplier requires 80 ns for a multiplication, which is the slowest execution stage, the processor's clock speed is limited to 100 ns. The additional 20 ns is necessary for enabling and disabling staging latches. The ALU offers an elaborate array of possible instructions, as will be considered below.

The I, J, and K register files are connected to the associated I, J, and K execution units, respectively by I, J, and K operand pathways indicated generally at 60, 62, and 64, respectively. These pathways function to transfer operands stored in selected locations in the register files to the corresponding execution files, in response to data-fetch commands in the program instructions, as will be considered below. Operand pathway 60, which is representative, includes first and second latches 66, 68 which receive operands from the first and second output ports of register file 40 through data buses 70, 72, respectively. A third data bus 74 in pathway 60 connects first latch 66 with both the MLU and ALU in the I execution unit. A fourth data bus 72 connects second latch 68 with the MLU in the execution unit, as shown. The latches just described and other latches used in the processor are 32-bit latches construed using four 74AS574 IC 8-bit latch chips available from Texas Instruments.

Also included in operand pathway 60 is a latch 80 which function to stage the contents of second latch 68 and a multiplexer 78 which functions to direct the contents of the third latch or a constant value supplied from a program evaluation unit (PEU) 82 to ALU 54, as indicated. The 32-bit multiplexer just described and other multiplexers used in the processor may be constructed using eight 4-bit 74AS157 IC multiplexer chips available from Texas Instruments. The function and construction of the PEU will be described below. At this point it is noted only that some arithmetic operations carried out by each execution unit involve a constant supplied by the program instructions from the PEU, through suitable command lines (not shown) connecting the PEU to the multiplexer. The contents of the third latch can also be transferred to a data memory 84, via a data bus 86, as will be considered further below. Multiplexer 78 and latch 80 are also referred to herein collectively as multiplexing means. As seen in the figure, each of the three operand pathways in the processor has associated multiplexing means.

The results generated by the three execution units can be directed to (a) selected locations in the register files, (b) data memory 84, via an address bus 85, or (c) one of the two CORDIC algorithm units, such as unit 164, in response to different store-operand commands carried in the program instruction. The structure and function of the CORDIC algorithm unit will be detailed below.

The structure used to return data from the execution units to selected locations in the register files includes a series of to-register latches, such as latches 88, 90, 92 associated with execution unit 50, which receive the operand results from respective execution units and selectively direct to the latch contents to selected register locations in response to write-to-register commands in the program instructions. As seen, the I and J execution units each have 2 to-register latches, and the K execution unit has three such latches. Three latches are required in the K unit to enable results from the K execution unit to be stored in any register file, for matrix/vector multiply operations. The data latched in the seven to-register latches are carried to the I, J, and K register files by I, J, and K return-data buses 100, 102, 104, respectively. The to-register latches and return-data buses are referred to herein collectively as data-return means.

The connection of each of the four ports of each register can now be appreciated. Both of the output ports of a register file connect to the associated execution unit. One of the input ports comes from an external data bus 86, while the other input port provides the return path from the execution unit via the data-return means. Of course, the primary purpose of the register files is to store data operands, though because of the processor's vector arrangement, they serve the secondary purpose of providing a transition from the processor's external single-width data bus to the internal three-wide execution bus.

The results of the execution units can also be passed by buffers 114, 116, and 118, for storage into data memory 84, via address bus 85 and a data-memory address register, formed by latches 89, 91. The three latches and the data bus connections between the latches and the data memory, including bus 85 and latches 89, 91 are also referred to herein collectively as data-transfer output means for passing selected addresses from the execution units to memory, in response to memory-access commands carried in the program instructions. The data-transfer output is used, for example, for executing a store register indirect plus constant instruction, as considered below.

With the architecture shown in FIG. 3, it is impossible to access operands directly from the data memory for functional evaluation. Whenever the contents of the data memory are required, they must first be loaded into the register file. Furthermore, since the results of all functional instructions are returned only to the register, operands from the register file can only be stored into data memory by a store command. Consequently, the robotic processor is a register-to-register based machine. RISC (Reduced Instruction Set Computer) studies have indicated that this organization allows faster execution speed via higher clock speeds, though the original motivation for this architecture was because of the processor's vector format.

Even though a register-to-register machine can execute instructions faster than a memory-to-memory machine, the overall performance speed is only advantageous if the number of load and store operations are kept to a minimum. Load and store instructions perform only data movement; no functional results are obtained.

Quantitatively, the time required to execute the total number of load and store operations, for a given program, must be less than the difference in time between the given RISC implementation and a comparable CISC (Complex Instruction Set Computer) implementation. So in order for the RISC architecture to win, it is important that enough registers are available to maintain all of the commonly used operands within the register file.

One possible improvement to the design of register-to-register machines, would be to overlap the load and store operation with functional operations. Such a system would have the advantage of a register-to-register execution speed without the penalty of nonfunctional load and store operations. This approach has the potential difficulty, however, of in that it introduces hardware problems as well as complicates machine programming. For example, this capability requires that the programmer must be able to concatenate any load or store instruction with any other functional instruction. A more thorough investigation is necessary before such a scheme can be implemented.

As mentioned above, the embodiment being described has three 64-register files, giving capacity for 64 vector registers. These register files can also be considered as 192 scalar registers. This arrangement gives the robotic processor the unique capability of using the register file as a combination of vector and scalar register. Most computers have two difference sets of registers, one for scalars and one for vectors. By combining both scalars and vectors into one storage unit, hardware resources are optimized and data movement time is saved.

Figure 4:
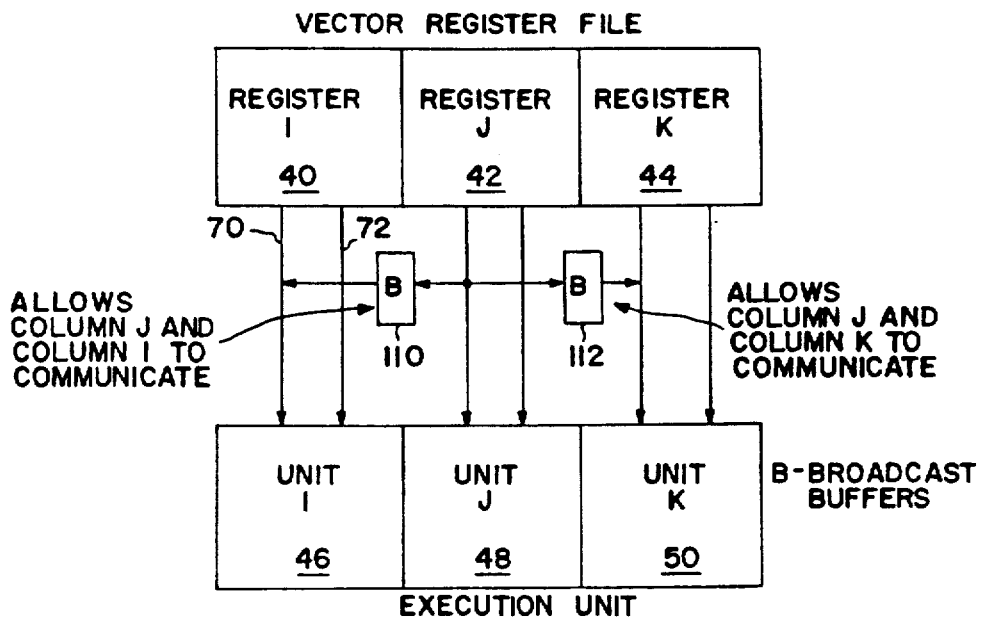
FIG. 4 is a block diagram showing how operand exchange between register files is accomplished in the FIG. 3 processor.

The execution of each functional instruction begins by accessing the necessary operands from the register file. These operands enter the three-wide execution unit via six possible data paths. The execution unit is considered three columns wide because it consists of three ALUs and three multipliers connected in parallel. Two data paths originate from each column of execution unit. Each column consists of a parallel combination of one ALU and one MLU. First and second broadcast buffers 110, 112 are provided to support intercolumn operations. This capability is needed to facilitate operations such as matrix-vector multiplies, and inter-column scalar-scalar operations. FIG. 4 illustrates how the broadcast buffers allow operands from the I and J pair of operand pathways, and form the J and K pair of operand pathways to exchange. Specifically, buffer 110 allows transfer of an operand from the J to I operand pathway, and buffer 112, from the J to the K operand pathway. The 32-bit broadcast buffers, and other buffers used in the processor, may be construed from four 8-bit buffer chips, as exemplified by 74AS244 buffers available from Texas Instruments.

The broadcast buffers of processor 20 are not fully general since only a subset of all possible paths are supported. This arrangement was chosen because our investigation showed that these data paths supported the necessary operations. Also, additional data paths added cost to the overall design. A more generalized robotic processor would supply all possible data paths, i.e., the four additional buffers need to connect all possible pairs of operand pathways in both directions.

As indicated above, one of the input ports of the ALU in each execution unit is multiplexed between the output of the register file and a constant field. This filed comes directly from the control pipeline and is used to supply immediate and absolute operands from the program memory. Even though the absolute operands only requires 17-bits of precision to completely address the external data bus, a full 32-bit data path is needed to support the immediate operands.

After an instruction has been evaluated, the destination multiplexer returns the results from the execution unit to the register file. The destination multiplexer is capable of rearranging the resulting components before storing them. In other words, the output of the I execution unit can be returned to the I or J register file; the output of the J execution unit can be returned to the J or K register file; and the output of the K execution unit can go to any of the three register files. As in the broadcast buffers, only a subset of all possible interconnections was implemented in the prototype robotic processor. An investigation of robot control equations showed that this particular arrangement supports all of the necessary operations.

The destination multiplexer combined with the broadcast buffers gives the robotic processor its unique capability of supporting both fast and efficient 3-D geometric processing while maintaining good scalar performance. The best way it illustrate the robotic processor's capabilities is by example. Two very common geometric operations are the vector cross-product and the 3-D matrix-vector multiply. Cross product operations result whenever the derivative of a vector in a moving coordinate frame is calculated (Goldstein). Matrix-vector multiples are used to perform coordinate rotations. Both of these operations are predominate in kinematic and dynamic equations. Tables 1 and 2 illustrate how the robotic processor is used to evaluate these operations. Other mathematic operations are described below,

TABLE 1

| Matrix/Vector Multiply Operation |
|---|
| $\begin{bmatrix} A_{1,i} & A_{1,j} & A_{1,k} \\ A_{2,i} & A_{2,j} & A_{2,k} \\ A_{3,i} & A_{3,j} & A_{3,k} \end{bmatrix} \begin{bmatrix} B_i \\ B_j \\ B_k \end{bmatrix} = \begin{bmatrix} C_i \\ C_j \\ C_k \end{bmatrix}$ |

$\vec{A_1} \cdot \vec{B} \rightarrow \vec{A_1}$ ;Element by element Vector Multiply
$\vec{A_2} \cdot \vec{B} \rightarrow \vec{A_2}$ ;Element by element Vector Multiply
$\vec{A_3} \cdot \vec{B} \rightarrow \vec{A_3}$ ;Element by element Vector Multiply
$A_{1,i} + A_{1,j} \rightarrow A_{1,j}$ ;Scalar Addition
$A_{2,i} + A_{2,j} \rightarrow A_{2,j}$ ;Scalar Addition
$A_{3,i} + A_{3,j} \rightarrow A_{3,j}$ ;Scalar Addition
$A_{1,j} + A_{1,k} \rightarrow C_i$ ;Scalar Addition
$A_{2,j} + A_{2,k} \rightarrow C_j$ ;Scalar Addition
$A_{3,j} + A_{3,k} \rightarrow C_k$ ;Scalar Addition A matrix-vector multiply requires 9 scalar multiplications and 6 scalar additions. The robotic processor can complete all 15 of these operations with 9 instructions, or within about 900 ns. Since the robotic processor executes each of these instructions with the same single-cycle format, once the pipeline is full, one instruction is completed every 100 ns. Though it should be remembered that the robotic processor is a register-to-register machine, the matrix and vector operands must be loaded into the register file before the operation can begin. The matrix will occupy three vector registers and the vector will use a fourth.

Since the robotic processor supports vector multiplication, or three simultaneous like-component multiplications, the 9 scalar multiplications can be completed with 3 instructions. Once the multiplications are complete, the components of each resulting vectors must be summed with an inner product operation. This is when the broadcast buffers and the destination multiplexer can be used to shuffle the scalar component so that the necessary scalar operations can be performed. The broadcast buffers allows different components of the same vector to be added, and the destination multiplexer deposits the result in the appropriate column. Note that the resultant vector is placed correctly in the register file. In other words, the ith component of the vector resides in the ith column of the register file. Therefore, this vector can immediately be used for further numeric operations.

A vector cross product (Table 2 below) requires 6 scalar multiplications and 3 scalar subtractions. It should be noted that a cross product can be formulated as a matrix-vector multiply by reorganizing the first vector of the operation as a skew-symmetric matrix (Table 3 below). Though the robotic processor can directly perform a cross product operation in 6 instructions, as shown in Table 2, note that a special "vector multiply with component rotate" instruction is used to help evaluate the operation. This instruction performs a vector multiply and shuffles the vector's components before restoring the result into the register file. In essence, the shuffling performs the same task as the skewing does when organized in the matrix-vector form. A NO-OP (no operation) instruction is placed as the fifth instruction because of the pipeline interdependencies. This problem is discussed in greater detail below. Of course, ideally this NO-OP would be replaced with a functional instruction for better hardware utilization.

TABLE 2

Vector Cross Product $\vec{C} = \vec{A} \times \vec{B}$
Defined as:
$C_i = A_j B_k - A_k B_j$
$C_j = A_k B_i - A_i B_k$
$C_k = A_i B_j - A_j B_i$

| Step 1 | $B_i \to T1_j$, |  |
|---|---|---|
|  | $B_j \to T1_k$, |  |
|  | $B_k \to T1_i$ | ; Rotate $\vec{B}$ and store in $\vec{T1}$ |
| Step 2 | $A_i \to T2_j$, |  |
|  | $A_j \to T2_k$, |  |
|  | $A_k \to T2_i$ | ; Rotate $\vec{A}$ and store in $\vec{T2}$ |
| Step 3 | $T1_j * A_i \to T1_j$, |  |
|  | $T1_j * A_j \to T1_k$, |  |
|  | $T1_k * A_k \to T1_i$ | ; Element by element Vector multiply with vector rotation |
| Step 4 | $T2_j * B_i \to T2_j$, |  |
|  | $T2_j * B_j \to T2_k$, |  |
|  | $T2_k * B_k \to T2_i$ | ; Element by element Vector multiply with vector rotation |
| Step 5 | No-Op | ; No operation due to pipeline interdependency |
| Step 6 | $T2_i - T1_i \to C_i$, |  |
|  | $T2_j - T1_j \to C_j$, |  |
|  | $T2_k - T1_k \to C_k$ | ; $\vec{T2}-\vec{T1}$ Vector Subtraction |

TABLE 3

Cross Product in Skew Symmetric Form $$\begin{bmatrix} 0 & -A_k & A_j \\ A_k & 0 & -A_i \\ -A_j & A_i & 0 \end{bmatrix} \times \begin{bmatrix} B_i \\ B_j \\ B_k \end{bmatrix} = \begin{bmatrix} C_i \\ C_j \\ C_k \end{bmatrix}$$

The illustration of the matrix-vector operation demonstrates that the robotic processor can perform scalar operations as well as vector operations. In fact, the robotic processor is unique in the sense that it performs vector, scalar, and vector/scalar operations all with the same hardware and with good efficiency.

The need for vector and scalar operations was demonstrated by the cross-product and matrix-vector multiply operations. Vector/scalar operations can also by useful. For example, they can be used to scale vector quantities. Consider Newton's second law:

$$F = mA$$

This equation can be thought of as scaling the acceleration vector by the mass in order to determine the force vector. This equation can be easily evaluated by the robotic processor with a single vector/scalar multiply. The scalar must originate from the jth column of the register file where it can be simultaneously broadcast (by the broadcast buffers) to all three columns of the execution unit.

Even though scalar operations only utilize one-third of the hardware, the ability to perform all three types of operations with the same hardware allows tremendous flexibility and generality. Basically, if programmed properly, the robotic processor has all of the capabilities of a high performance general purpose microprocessor with added performance for operating on 3-D vectors.

B. Program Evaluation Unit

Program instructions are executed under pipelined control from PEU 82 to the three-wide, register-to-register processor architecture described above, which increases computation speed. Thus, the PEU is a pipelined instruction execution format was adopted for the following reasons: simplicity of design, reduced design time, and a faster clock speed. For classification purposes, a nonfunctional instruction performs only data movement or program control. In this case, the only nonfunctional instructions are load, store, and jump instructions.

All functional instructions are evaluated in the following sequence: 1) instruction fetch, 2) operand fetch, 3) instruction execute, and 4) operand store. This allows the design of the control unit to be greatly simplified, therefore a higher clock speed can be achieved. A higher clock speed is possible because a simpler design implies simpler, and hence faster, logic. A register-to-register structure helps to maintain this execution format.

Since the flow of each functional instruction is consistent, pipelining the instruction execution was made much easier. The primary problem of pipelining is to resolve all possible hardware contention problems, consequently a consistent instruction format simplifies the bookkeeping of what hardware is used at what time. For example, with the functional instructions the instruction fetch uses the program memory, the operand fetch uses the register file, the instruction execute unit, and the operand store also uses the register file. Since the register has separate input and output ports, which can operate simultaneously, the operand fetch and operand store can occur simultaneously. The difficulty in pipelining the robotic processor was to conform the functional and nonfunctional operations into a compatible structure. Appendix A illustrates how each category of instruction is partitioned in order to solve this problem One of the more complicated instructions to conform to this four-stage format is the ST A.i (Reg Indirect+-Constant) instruction. This instruction stores the value of register A.i into the data memory at address location (Reg Indirect+Constant). The first stage of this instruction is an instruction fetch, like all other instructions. During stage two, both the data stored in A.i and the indirect address register are accessed and latched. Stage 3 passes the data to a data bus latch such as latch 80, where it is stored for one cycle before it can be placed into data memory. Simultaneously, an ALU adds the indirect address to a constant and stores the result in the data memory address register. The constant is passed from the control unit to the ALU in the I execution file through an appropriate multiplexer. Stage 4 addresses the data memory using the data memory address register, and stores the data in the data bus latch into the appropriate memory location. By following this instruction through FIG. 3, it can be seen that the interconnection between the appropriate data paths is very important. For example, it is very important that the first, rather than the second, output port of the register file is connected from the register file to the data bus latch. This allows the data operand and the address operand to be simultaneously processed.

Figure 5:
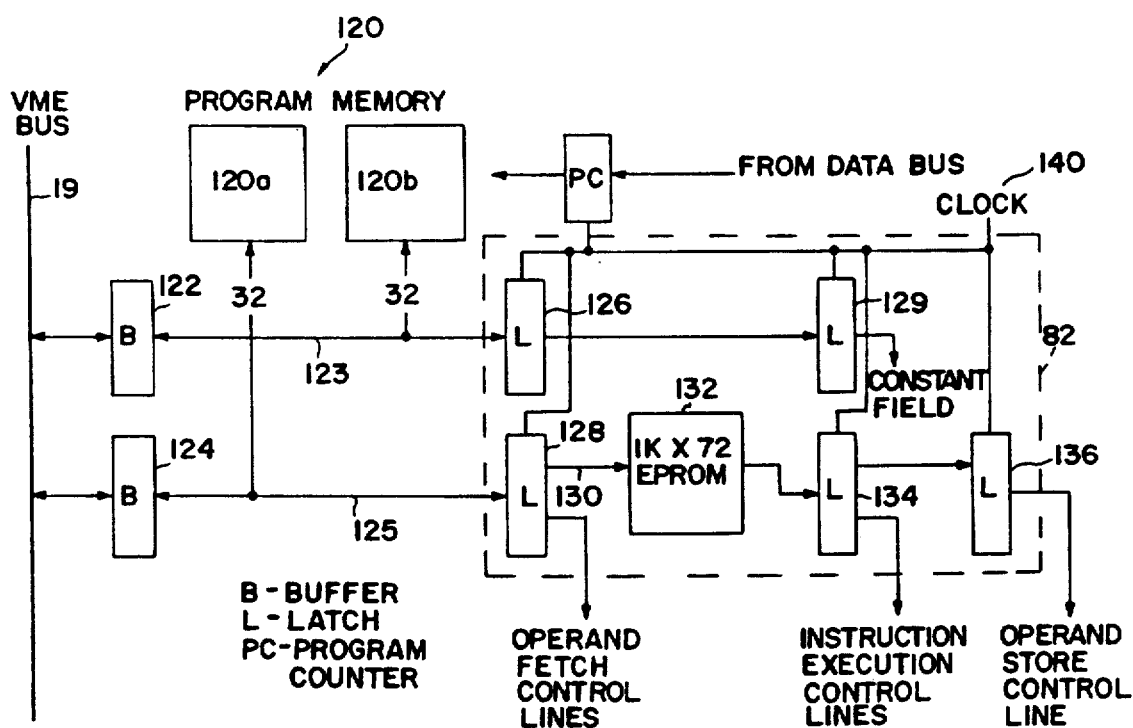
FIG. 5 is a block diagram of the pipelined instruction evaluation unit of the processor, and related program memory and communication components.

FIG. 5 shows the construction of the Program Instruction Execution Unit (PIEU) 82, and the communication to the VME bus 19, a program memory 120, and the PIEU. Since the robotic processor maintains separate data and program memory, the program memory and data memory they can be arranged in different formats. As will be discussed further below, the program memory is arranged in a 64-bit format to simplify the instruction execution process and the hardware design of the control unit. During each instruction fetch, a new 64-bit word is read from the program memory into the control pipeline. This long word is partitioned into two 32-bit words; the lower word forms a constant field and the upper word defines the instruction. As shown in FIG. 5, the program memory is actually composed of a 32-bit instruction memory 120a, and a 32-bit constant-field memory 120b. Each 32-bit memory is formed of 16 8 k×8 Fugita 81c78 chips. The program memory is loaded from the VME bus through a pair of buffers 122, 124, as shown, alternating between each memory as each 64-bit instruction word is entered, at consecutive even and odd addresses in the two memories, thus allowing each 64-bit instruction word to be addressed with a single address. The two 32-bit buses connecting buffers 122 and 124 and memories 120a and 120b to the PIEU are indicated at 123 and 125 respectively. These buses, and above-mentioned data bus 86 connecting the data memory to the register files, are also referred to herein as data-transfer input for receiving the series of program instructions and data from memory.

The PIEU, which is shown within dashed lines 82 in FIG. 5, is basically a sequence of latches and firmware decoders. Once a new instruction is latched by the first set of latches 126, 128, the control signals for reading the source operands from the register file are passed down into the processor. The 32-bit constant field word passes from latch 126 to a 32-bit latch 129. From this latch, the constant field can be placed in one of the execution ALU's, through the associated MUX, as can be appreciated from FIG. 3. Since the ALUs are only used during the third stage of execution, the constant field enters the ALUs during this stage.

The 64-bit instruction word is divided by latch 128 into a 10-bit EPROM address and a 22-bit operand store and fetch instruction. The latter instruction is directed from latch 128 to appropriate processor elements. The 10-bit EPROM address word is passed on a bus 130 to address a microcoded EPROM 132 for further decoding of the instruction. Since EPROMs are used to decode each instruction, the instruction set can be easily changed. One preferred EPROM is a 7C263 EPROM supplied by Cypress. As will be seen below with reference to FIG. 15, the EPROM outputs a 46-bit instruction used for program execution, and a 26-bit outputs of the EPROM are carried by a 72-bit bus to a 72-bit latch 134. The 26-bit word from the EPROM is further passed to a latch 136, where the word codes are distributed to appropriate elements in the processor. The word codes in the 46-bit words are distributed from latch 134 to the appropriate execution elements in the processor.

The last stage of latches in the control pipeline broadcast the appropriate control signals to complete each instruction. For functional instructions, this involves selecting the proper outputs of the destination multiplexer as well as writing the results into the appropriate location in the register file.

The instruction processing procedure of the robotic processor was kept simple for both design and speed purposes. Pipelining was included to increase the execution speed of the processor. Basically, pipelining increased the execution speed four times.

Each of the latches in the PIEU is controlled by a clock 140 as shown. The maximum clock speed of any pipelined system is limited by the propagation delay of the slowest stage. In this case, the execution unit is the slowest stage since the MLU's require 80 ns to complete a multiply. Since a set up time of the input and output latches must also be included, a 100 ns clock cycle is used. The other three stages require much less processing time. In fact, one way of increasing the clock speed is to divide the execution unit into two stages. This change could possible double the clock speed, hence higher performance might be possible.

With reference to both FIGS. 3 and 5, a program counter 144 may receive a "jump" instruction address from a 16-bit address stored in a latch 148 and received from the data bus. A flag unit 150 which is described in Section C below provides a yes/no signal to the counter for acting on the jump address in the latch. The counter is connected to clock 140, as indicated.

C. Condition Codes

The robotic processor uses three AMD 29332 ALUs to support 3-D vector arithmetic and logic functions. The AMD 29332 provides status bits for following functions: carry, zero, negative, overflow and linking. Consequently, all of the standard conditional operations are possible.

Since the robotic processor has three ALUs it has the unique feature of having three sets of status bits. By checking for different combinations of these bits it is possible to perform some interesting operations. For example, a useful condition to check for is the zero vector condition. In other words, check and see if all three components a vector are zero. The test for this condition is to simultaneously examine all three zero bits.

Figure 6:
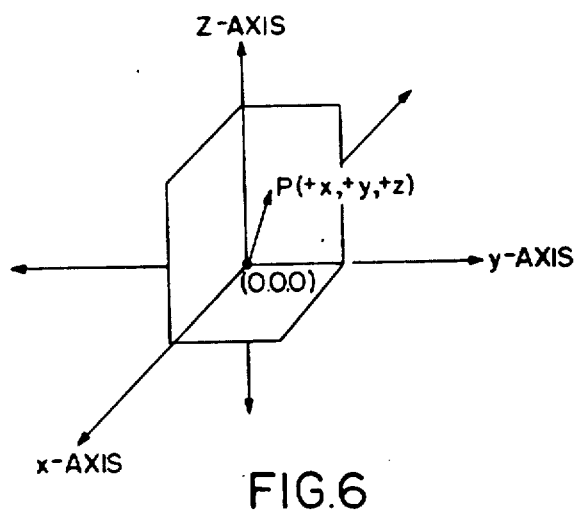
FIG. 6 illustrates the use of the processor's flag unit for checking the direction of a vector.

Many other possibilities can also be envisioned. For example, it would be possible to immediately determine whether or not a 3-D vector is in a particular quadrant. FIG. 6 illustrates a check for determining whether or not a vector is in the first quadrant of a 3-D space. Perhaps the problem is not how to develop these new conditions, but rather to determine which of these many possibilities will prove useful. Since the answer was not clear during the design of the processor, a very general flag test unit had to be designed.

Figure 7:
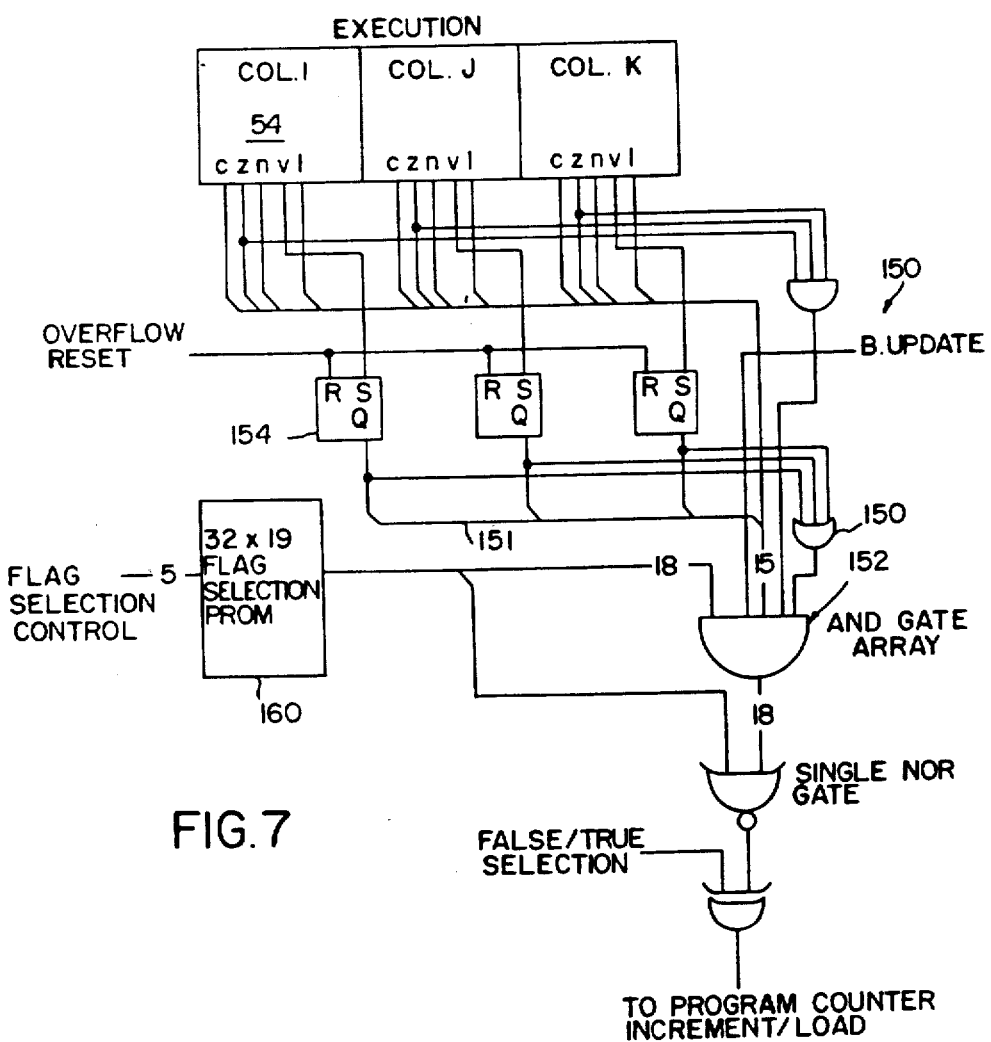
FIG. 7 is a block diagram of the processor flag unit.

A schematic block diagram of flag unit 150 is shown in FIG. 7. Here each of the ALUs, such as ALU 54, are shown with their five accumulator registers with c, z, n, v, and 1 registers. The 15 register bits are connected through a 15-bit bus 151 to an array of 15 AND gates, indicated generally at 152. Each of the three overflow (v) registers is routed through a set/reset flip-flop, such as flip-flop 154 which is used mark overflow events, and the output of the three flip-flops is gated through an OR gate 157 whose output in turn is gated by a sixteenth AND gate in array 152. The z register values and a B Update (below) are gated through two additional AND gates in the AND gate array as indicated.

Each of the AND gates in the array is also connected to an 18-bit flag section PROM 160 which can be used to test for any register state, or any combination of states, as discussed above. Depending on whether a selected state is present, the flag unit outputs a yes/no signal to the program counter, as indicated.

The flag unit is general in the sense that any combination of these 15 status bits can be checked for. But in order to avoid excessive hardware, and the fact that not all of these combinations will be useful, only 32 of these possibilities can be implemented at a given time. The selected 32 combinations are programmed into firmware, hence they can be easily modified. Explaining further, the hardware merely sensitizes the desired conditional path. One input of each of these gates is from the flags section PROM. Therefore, in order to test the zero status bit of the ith ALU, the corresponding AND gate is activated by the PROM. Note that more than one AND gate can be simultaneously activated whenever a condition which uses a combination of status bits is desired. This capability of activating more than one status bit is what gives the flag unit its generality. The final XOR gate allows the testing for both the true and complement of any combination. The XOR outputs to the program counter to determine whether or not to load a new program address.

Another interesting problem associated with multiple status bits is that the correct one must be used whenever testing the results of scalar operations. For example, it is important to test the status bits of the kth column's ALU if the condition under test used the kth column for execution. This bookkeeping is fairly simple to do when writing in assembly language, but ultimately high-level programming capabilities are desired. In this case, the compiler will need to automatically determine and test the correct bit.

The processor allows individual testing of any of the status bits, and has also included a couple of vector combinations. As mentioned earlier, a zero vector test condition is implemented. A vector overflow test has also been incorporated. The vector overflow condition can simultaneously check to see if any mathematical operations, vector or scalar, has caused an overflow condition. Note the overflow bit is latched so that only one check can determine whether or not an overflow occurred during a sequence of operations. A special B update condition has also been included to allow the processor to branch whenever a new update pulse is received. This allows a fast and efficient means to acknowledge a new update period.

D. CORDIC Algorithm Unit

Solving a robot manipulator's kinematic and dynamic equations generally involves performing multiple coordinate transformation and trigonometric function evaluations. An intuitive explanation is that robot calculations are generally performed in several different coordinate frames. Consequently, once a parameter has been calculated in one coordinate frame it is often necessary to translate its value into a new reference frame for further calculations. Since robot manipulators are generally attached at a fixed base, trigonometric relationships are required for expressing the necessary relationships.

A good example of this is the Recursive Newton-Euler inverse dynamic equations. The equations calculate the angular velocity of each link with respect to the links own frame. Therefore, in order to determine the angular velocity of the link with respect to the base, the velocity of the preceding links must also be accounted for. A coordinate transformation placing both of these values in the same reference frame is necessary before this addition can be performed. The coordinate transformation is comprised of a matrix of which many require elements solving trigonometric relationships.

The robotic processor attacks this problem by incorporating two novel CORDIC coprocessors into its design. The CORDIC coprocessor is custom VLSI chip which was designed in support of the present invention. The CORDIC algorithm is not new, but the CORDIC chip's architecture is unique. The initial design of the CORDIC chip, the one used for the present processor, calculates to only 25 bits of accuracy because of constraints on the dye size. Its architecture is massively parallel implementation of the CORDIC algorithm, and requires over 63,000 transistors for this 25 bit version. The same construction and operation can be applied to a 32-bit unit.

The name "CORDIC" stands for Coordinate Rotation Digital Computer. The algorithm was developed by (Volder), and was originally incorporated into computers for real-time navigation purposes. The CORDIC algorithm implements two-dimensional vector, or coordinate, rotations with only simple shift and add operations. Even though the CORDIC algorithm only offers linear convergence, since shift and add operations are generally among a computer's fastest operations, vector rotations can be performed at a very high speed. If set up properly, these vectors rotations can be used to evaluate trigonometric functions.

The CORDIC algorithm is based on the fact that a vector $(x_1, Y_1)$ rotated through an angle theta may be expressed as:

$$x_2 = \cos\theta(x_1 \mp y_1 * \tan\theta)$$
$$y_2 = \cos\theta(y_1 \pm x_1 * \tan\theta) \quad (1)$$

where $(x_2, Y_2)$ is the resultant vector. The choice of addition or subtraction depends on the direction of rotation.

As mentioned earlier, the CORDIC algorithm performs these coordinate rotations with only simple shift and add operations. Because computers are very fast at shifts and adds, the algorithm can be evaluated very fast. The technique which allows this, which is the key to the CORDIC algorithm, is to set:

$$\tan\theta = 2^{-(i-1)} \quad i = 1, 2, 3, \ldots n. \quad (2)$$

Therefore, cosine $\theta$ becomes:

$$\cos\theta = 1/(1+2^{-(i-1)})^x \tag{3}$$

and by plugging these expressions into equations 1, they become:

$$x_{i+1} = 1/(1+2^{-(i-1)})^x(x_1 \mp y_1 * 2^{-(i-1)})$$

$$y_{i+1} = 1/(1+2^{-(i-1)})^x(y_1 \pm x_1 * 2^{-(i-1)}) \tag{4}$$

where $(x_{i+1}, y_{i+1})$ represents the new vector after the ith iteration. We can rewrite these equations by adding a variable $delta_i$ to set the direction of rotation for each iteration. The selection of $\Delta_i$ determines the actual CORDIC operation and is discussed later in this section. By including $\Delta_i$, the equations become:

$$x_{i+1} = k_i(x_i - \Delta_i y_i * 2^{-(i-1)})$$

$$y_{i+1} = k_i(y_i + \Delta_i x_i * 2^{-(i-1)}) \tag{5}$$

where $k_i = 1/(1+2^{-(i-1)})^x$
and $\Delta_i = \pm 1$

Therefore, after n iterations we have rotated a vector by the amount:

$$\theta = \Sigma\Delta_i \arctan 2^{-(i-1)} \quad i=1,2,3,\ldots n. \tag{6}$$

This equation shows that with the proper selection of $\Delta_i$s the CORDIC algorithm can rotate a vector through an angle $\theta$. Of course, only angles which can be generated by this summation are possible. (Volder) proved that with this formula, n iterations will give a result accurate to n-bits for any arbitrary rotation between $+/-90$ degrees. This result also indicates that the CORDIC algorithm offers linear convergence.

The factor $k_i$ represents a scaling factor intrinsic to the CORDIC algorithm. Not that $k_i$ is independent of $\Delta_i$. Therefore, if the number of iterations is a fixed number n, we can factor out a constant K equal to the products of the $k_i$, from $i=1,2,3,\ldots n$. Therefore we can write equation 5 in the form:

$$x_{i+1} = (x_i - \Delta_i y_i * 2^{-(i-1)})$$

$$y_{i+1} = (y_i + \Delta_i x_i * 2^{-(i-1)}) \tag{7}$$

and the final vector $(x_n, y_n)$ can be scaled by a constant K after the nth iteration.

To increase the maximum range of rotation form $+/-90$ degrees to $+/-180$ degrees, and additional 90 degree rotation can be performed by changing the first iteration to the following:

$$x_2 = -\Delta_1 y_1$$

$$y_2 = +\Delta_1 x_1 \tag{8}$$

This operation performs an exact rotation of the initial vector by $+/-90$ degrees upon the choice of $\Delta$. The remaining $n-1$ iterations are performed as before. So equations 7 becomes:

$$x_{i+1} = (x_i - \Delta_i y_i * 2^{-(i-1)})$$

$$y_{i+1} = (y_i + \Delta_i x_i * 2^{-(i-1)}) \tag{9}$$

for $i=2, 3, 4, \ldots, n$.

The CORDIC algorithm can operate in two basic modes: Rotate and Vector. The Rotate operation routes a vector by a specified angle. This operation can be used for coordinate rotations as well as vector rotations since one is merely the opposite of the other. In other words, a vector rotation by 30 degrees is equivalent to $-30$ degree rotation of the coordinate system.

Figures 8A, 8B:
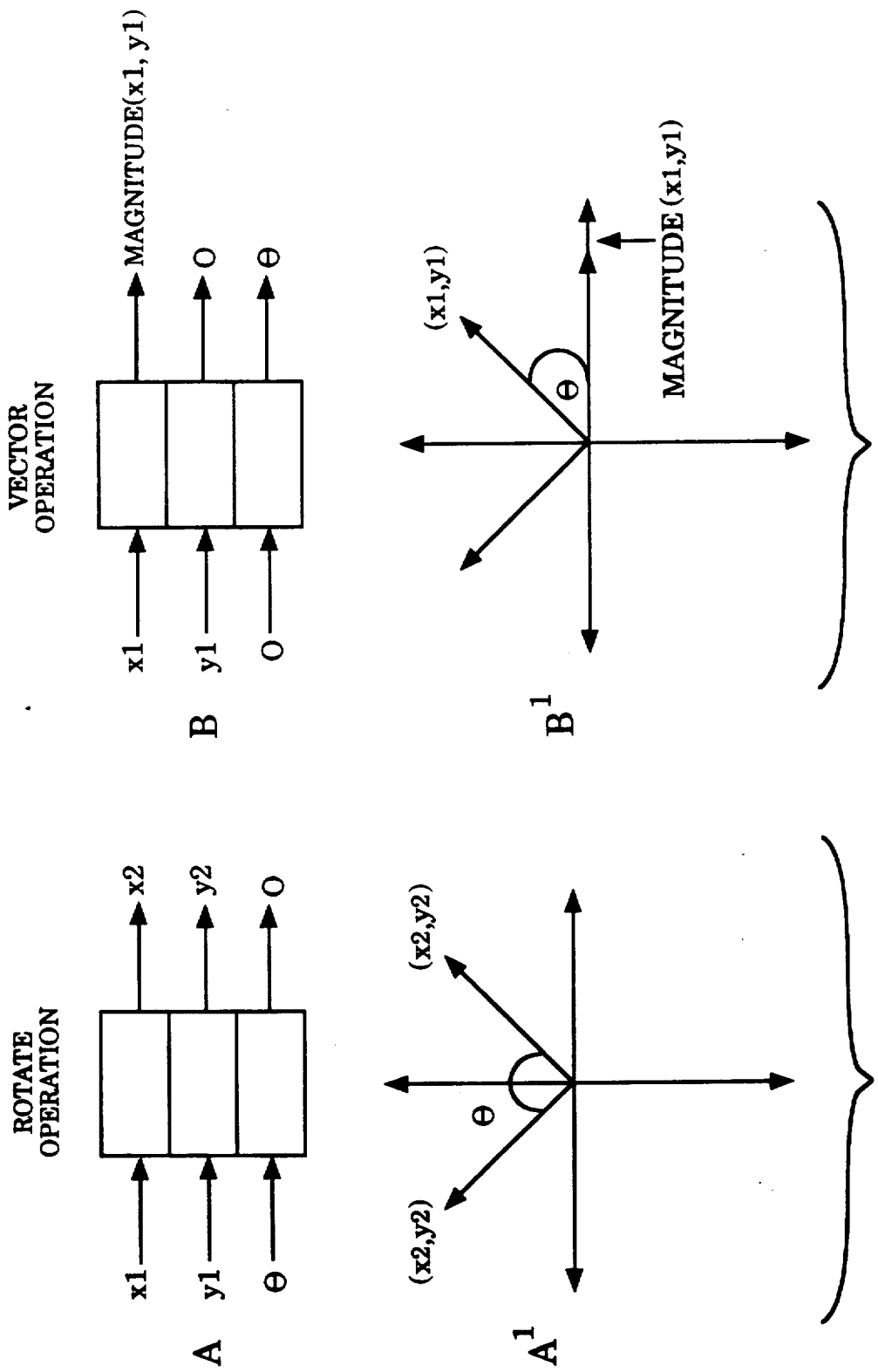
FIG. 8a illustrates a vector rotate operation performed by the CORDIC algorithm chip in the processor.
FIG. 8b illustrates a vector operation performed by the CORDIC algorithm chip in the processor.

The Rotate operation, illustrated in FIG. 8a, can also be used for trigonometric function evaluations. The sine and cosine of an angle $\theta$ can be evaluated with a Rotate operation by initializing a unit vector directed along the positive x-axis. After the Rotate operations, the vector is rotated with an angle $\theta$, and the x and y components become Ksin $\theta$ and Kcos $\theta$. The offset constant can be easily factored out. Notice that both the sine and cosine of theta are evaluated simultaneously. Generally both results are needed in kinematic and dynamic equations.

The Vector operation, illustrated in FIG. 8b, rotates an arbitrary vector onto the positive x-axis. The result of this operation is essentially a transformation between Cartesian and polar coordinates. In other words, a Vector operation will take a vector $(x_1, y_1)$, and output the results arctan $(y_1/x_1)$ and $\sqrt{x_1^2 + y_1^2}$. The arctangent operation is used frequently in robotic computations.

The Rotate and Vector operations only differ by the method in which $\Delta_i$ is selected. For the Rotate operation, a z-register is initially loaded with the desired angle of rotation theta. Upon each successive iteration, the incremental rotation is added or subtracted from the contents of the z-register, depending upon the current sign of the z-register. In other words, the sign of z governs the choice of $\Delta_i$. If the current value of z is positive, $\Delta_i$ is chosen as $-1$. With this formula it is easy to see that after each iteration, z tends closer towards zero. Since $\Delta_i$ also controls the rotation by the $(x_i, y_i)$ vector, the final vector is rotated by $\theta$. The mathematical equation that governs the operation of the z-register can be written as:

$$z_{i+1} = z_i - \Delta_i \arctan(2^{-(i-2)}) \tag{10}$$

The Vector operation initialized the value of z to zero. Upon each iteration the new value of $\Delta_i$ is determined by the current sign of the y-register. If y is positive, $\Delta_i$ becomes $-1$. If y is negative, $\Delta_i$ becomes $+1$. This strategy will drive the y register to zero, or rotate the vector onto the x-axis. After the final iteration, the magnitude of the initial vector is in the x-register, and the angle of rotation is in the z-register. Consequently, the Vector operation performs a transformation between Cartesian coordinates and polar coordinates.

The robotic processor exemplified herein employs two CORDIC subsystems or units to perform coordinate rotations and trigonometric function evaluations. The output of each unit appear to the user as another vector register. Therefore, the same move instructions as those used to move data about in the register file can be used to read from the CORDIC units. Since a CORDIC operation takes much longer than the other processor instructions, the program must wait a predefined time between loading input operands and reading the final results. When a high-level language is used, the compiler must account for this time automatically. Each unit is loaded by a Vector or Rotate instruction which specifies the register of the intended operand. A scaling vector is included so that the intrinsic scaling factor of the CORDIC algorithm can be compensated with a premultiply before placing the operand into the unit's input latches.

The processor shown in FIG. 3 has two CORDIC units 164, 166. As seen, each unit contains three input latches, such as latches 168, 170, 172, associated with unit 164, which can receive operands directly form the I, J, and K execution units, respectively. These latches stage the operands for unit operation.

Figure 9:
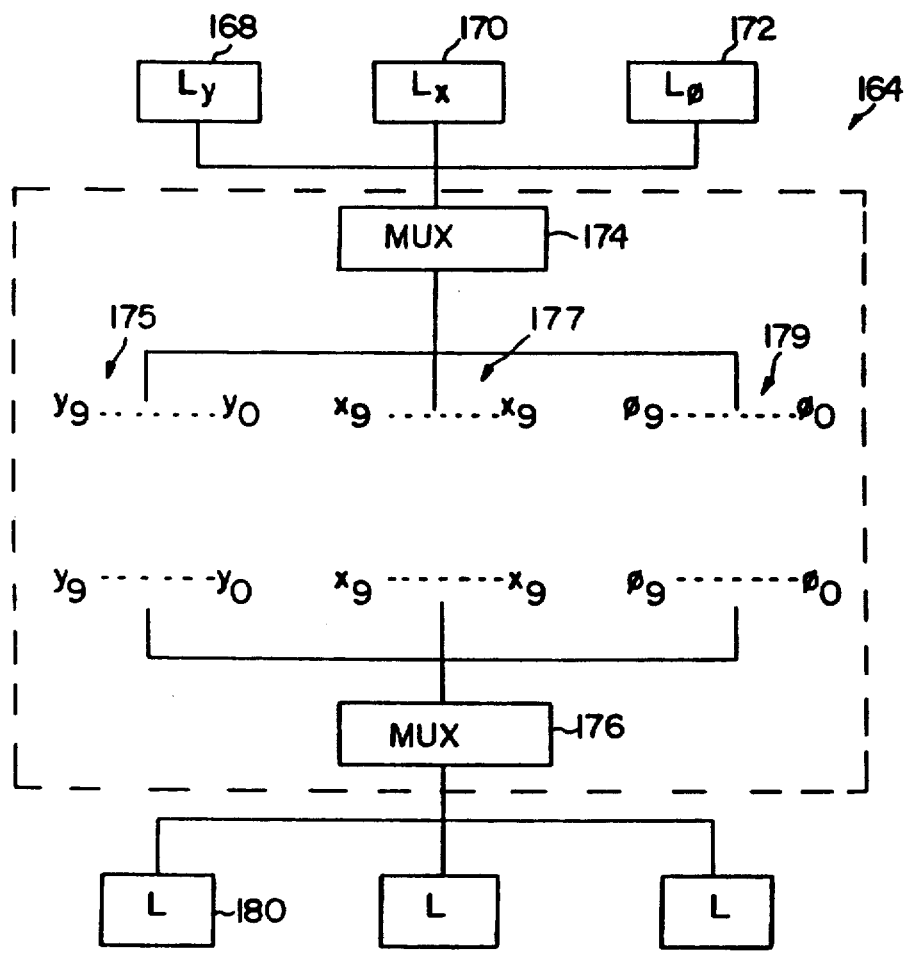
FIG. 9 is a block diagram of the CORDIC algorithm unit.
Figure 10:
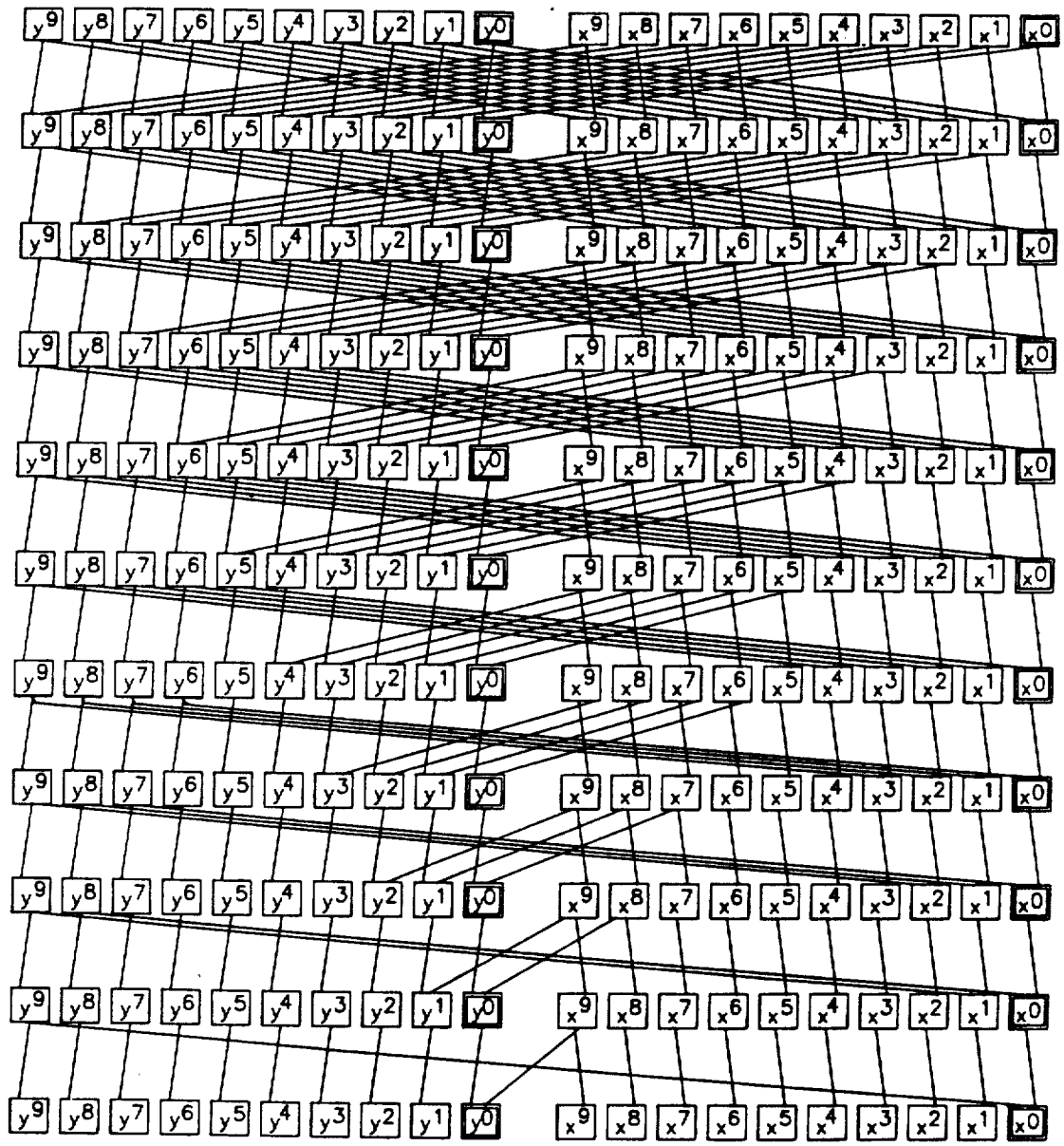
FIG. 10 shows the successive-iteration adder connections between 10-bit x and y operands i the chip of the CORDIC algorithm unit.
Figure 11:
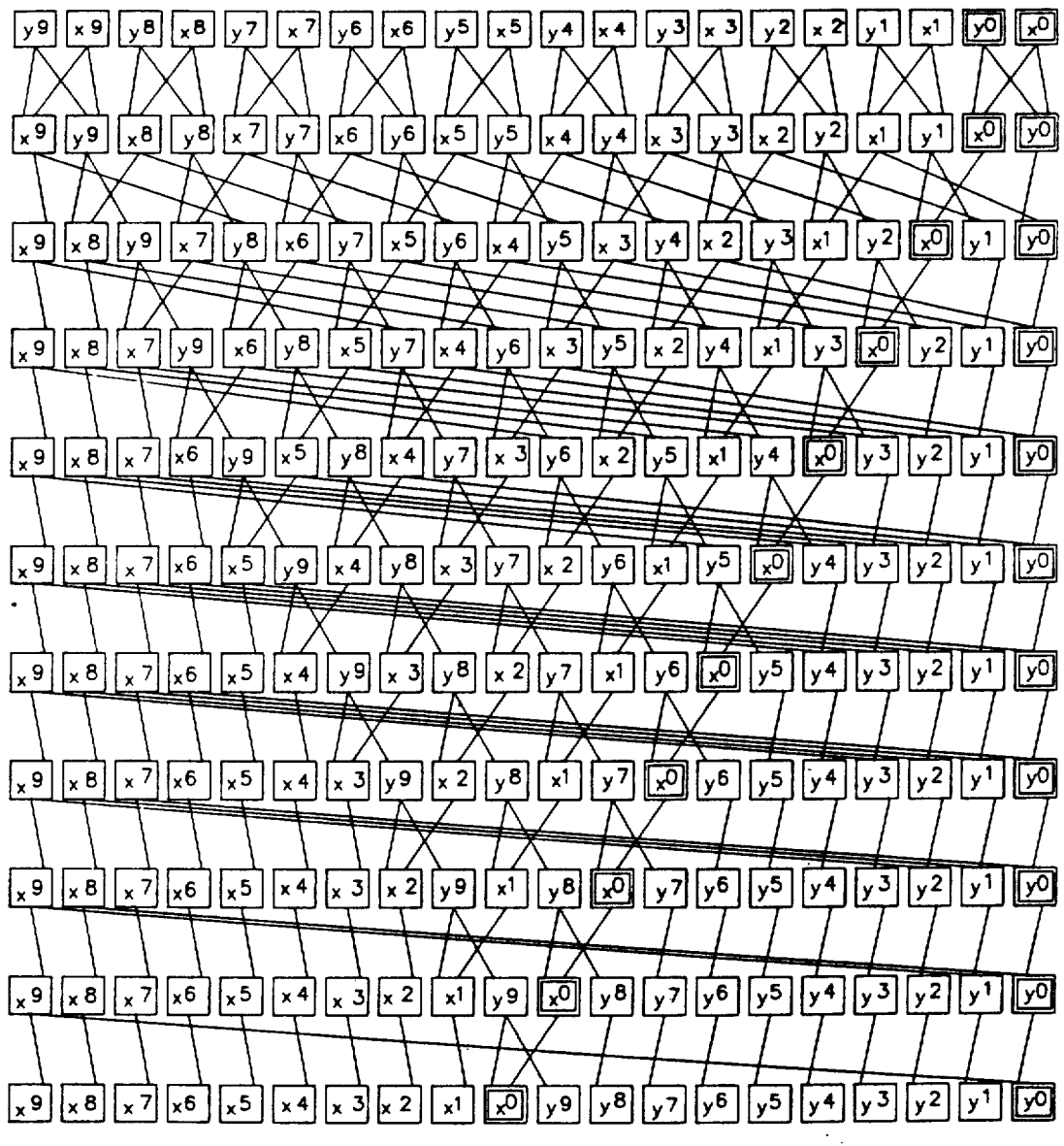
FIG. 11 shows the actual arrangement of adders in the FIG. 10 chip.

Unit 164, which is representative, is shown in greater detail in FIGS. 9-11. FIG. 9 shows the three latches 168, 170, 172 which receive the input operand, such as the vector components x and y and the angle theta of vector rotation. For illustrative purposes, the operands will be considered as 10-bit numbers, since the general principles described below will apply as well to larger numbers, e.g., 32-bit numbers. A multiplexer 174 in the chip functions to direct the contents of each latch onto the first row of adders, indicated in the figure at 175, 177, and 179 by 10 adders for each of the three operands. The adder architecture consists of 3 columns of n-bit adder cells each n cell deep. FIG. 10 shows the x and y columns of 10-bit adders for illustrative purposes. The series of additions which are performed on the two columns implement equation 9, by successive add operations which converge on the solution. One major advantage of this architecture is that the shifts are built directly into the connecting pattern between the adders. Also, since the unit operates asynchronously, all of the signals can travel at their maximum speed to derive the answer.

FIG. 11 shows a diagram of the VLSI organization of the x and y adder columns in a IC chip used in the unit. The V pattern which overlies the length of the chip is due to the interchanging of x and y adders. An interleaved pattern was chosen in order to minimize the length of interconnecting wires. The interconnection between adders was the most difficult part of the chip to implement.

With reference again to FIG. 9, the results of the algorithm are passed from three columns in the final row of adders by a multiplexer 176 to three output latches, such as latch 180 which stores the results of the x column. As seen in FIG. 3, these latches are each connected to an associated I, J, or K operand pathway. The CORDIC unit latches, such as latch 180, serve the same purpose as the corresponding I, J, or K register file, in that the data in them is called up by program instruction for use by the associated execution unit.

The CORDIC chips add another degree of parallelism to the robotic processor. Since the CORDIC units are separate from the execution unit, they can operate simultaneously. The method with which the CORDIC sub-systems are attached to the processor allows more chips to be easily added.

E. Processor Memory and Interfacing

The robotic processor is specifically designed for real-time robot control applications. Consequently, the design was optimized for the fast run-time execution. A separate program and data memory is used to overlap instruction fetch, and data-memory-access operations. This separation also allows the two memories to be formatted differently, as discussed above. Generally, such an organization is called a Harvard architecture (TI), and has already been successfully exploited by many digital signal processors. Overlapping the instruction fetch with the data-memory-access obviously improves execution speed.

The program memory is organized in a 64-bit long word format. Since every instruction can be completely expressed in 64-bits, a new instruction is fetched every clock cycle. This format allows a simple decoding scheme which facilitates the fast and simple processing of each instruction. The data memory is formatted as 32-bit words, which is the standard operand width.

Robot control programs intrinsically execute in a looping fashion. This loop is performed once every update cycle. Consequently, the size of the robotic processor's program memory only needs to be large enough to store one copy of the entire control loop. A 32-kilo long word (64-bits) program memory was considered large enough to store most complex control algorithms, hence this size is used in the system. Since a new instruction completes every 100 ns (once the pipeline is full), it would take 3.5 milliseconds to sequentially execute through the entire program memory. Of course, generally there will be many subloops in one cycle of the control algorithm.

A 64 kilo word (32 bits) data memory was considered large enough to store the necessary data for advanced control algorithms. One area of robotic research which requires large amounts of memory is learning control. Learning control algorithms use the information of past trajectories to improve its performance on future iterations. Many different algorithms have been proposed to compensate for past errors. Sixty four kilo words should be sufficient to even support this type of research.

The robotic processor can communicate with the other processors in the FIG. 2 system via three different channels. A command register is provided for immediate communication with the host, and a command unit is provided for sequential communication with the host. The I/O handler (FIG. 2) can also directly access the robotic processor's data memory for transferring data from any of the attached servo controllers or the host.

The command register consists of two 32-bit registers 182, 184, one facing each direction. The most significant 8-bits of each register send predefined status instead of data. Status information, like whether the robotic processor is in run mode or program mode, is available to the Host. Consequently, only 24-bits of data can be transmitted between the Host and robotic processor with the command register.

The command unit is made from two 64-deep 32-bit FIFOs 186, 188, one facing each direction. The command unit can be used to transmit asynchronously sequential data between the processors. There are many possible uses for this channel. For example, trajectory data, which is inherently sequential, can be easily passed from the Host to the robotic processor.

The command registers are visualized as a "command" passing unit, though they could also be used to transmit data. Direct memory to memory transfer facilities are provided for data sharing. A special processing subsystem, the I/O Handler, controls all such interprocessor data transferring. Also seen in FIG. 3 are data and address interfacing between the B bus 24 in FIG. 2 and the data memory and processor data and address buses.

F. Update Interrupt and Function Calls

The robot control problem can be divided into many different levels. Task planning, trajectory planning, and servoing is a common taxonomy for such a division. The servoing algorithm would generally operate at roughly 100 milliseconds, and the task planner would update on the order of a second. Consequently, if one control system is to perform all of these functions, a simple means must be provided to nest these different levels.

Figure 12:
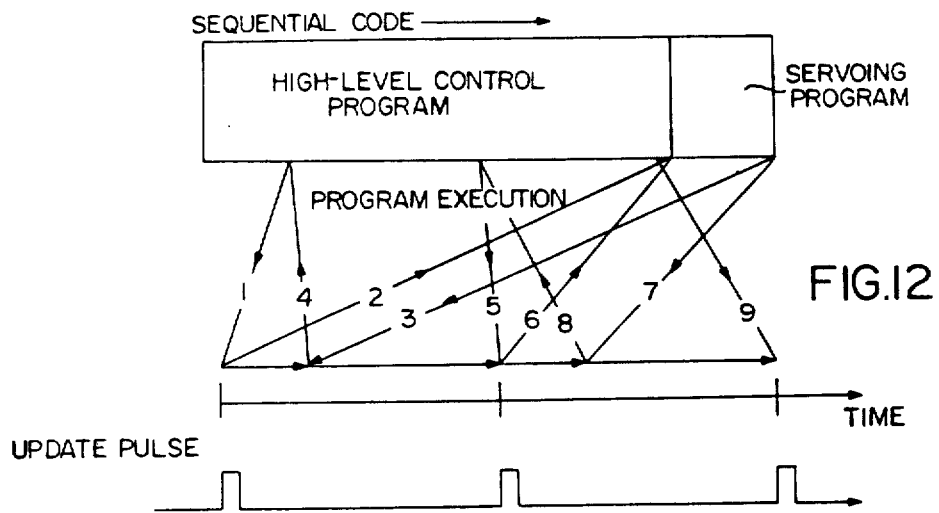
FIG. 12 illustrates the multiplexing of the main high-level control algorithm for robotics motion control with the servoing algorithm.

A solution to this problem is provided with the robotic processor by including a dedicated interrupt, which is illustrated generally in FIG. 12. This solution basically only solves the nesting of the servoing algorithm with higher-level control. The included interrupt is triggered upon each update period, and can be used to initiate the evaluation of the servoing algorithm, provided that the servoing algorithm is placed as the interrupt service routine. With this strategy, a higher-level control algorithm, which has a slower update cycle, can be evaluated as the main routine. Upon each update pulse, the servoing algorithm is evaluated, new torques are output to the robot's actuators, and control is returned to the main routine. The numbered lines in FIG. 12 show the multiplexing of the main high-level control algorithm with the servoing algorithm.

Note that this strategy is only possible if the servoing algorithm can be performed in a fraction of the servoing update time. Otherwise there would be no additional time to evaluate the higher-level control algorithms. Presently, no control system has the necessary computational power to evaluate advanced servoing algorithms and still have remaining time for more computations. The present processor is the first robot control processor capable of such a feat.

The interrupt instruction is essentially a vectored branch instruction which is activated by the update pulse. In the present processor, the vector location is programmed into firmware so that it is easily changed. Of course, upon branching to the interrupt service routine, the program counter and the status bits must be saved so that the processor can be restored to its original state after completing the interrupt service routine. The robotic processor accomplishes these tasks by saving the program counter in a predefined register of the register file and storing the status bits in internal storage registers which are hidden from the user. The return from the interrupt service routine is performed by a RTI instruction. This instruction merely transfers the data from the predefined register to the program counter. Therefore it is important that the programmer must be careful not to overwrite the stored program counter value. If that register is needed, the programmer must first move the contents into the data memory.

The robotic processor's also supports function calls by providing a JSR and a RET instruction. The JSR instruction works identically to the interrupt instruction except that it uses a different program counter value, and that it uses a different predefined register. The RET instruction is identical to RTI except that it restore the program counter from the predefined register used with JSR, and not the interrupt instruction.

Since there is no designated stack or windowed registers, the passing, storing, and overwriting of variables is left up entirely to the user. The method was incorporated basically to simplify the hardware design. Also, since robot control algorithms are generally straight code with very few control statements, this arrangement does not present much of a programming difficulty.

The JSR and interrupt jump instruction store different values of the program counter. In both cases, delayed values of the program counter are stored into predefined register. The reason delayed values are stored is because of the pipelined nature of the processor. The program counter is always 4 counts ahead of the last complete instruction. The JSR and the interrupt instruction store different locations. A return from subroutine, or RTS begins execution immediately after the calling JSR instruction, whereas a return from interrupt, or RTI, must begin execution on the instruction which was replaced by the interrupt instruction. Note that the interrupt instruction is processed after the currently executing instruction.

Figure 13:
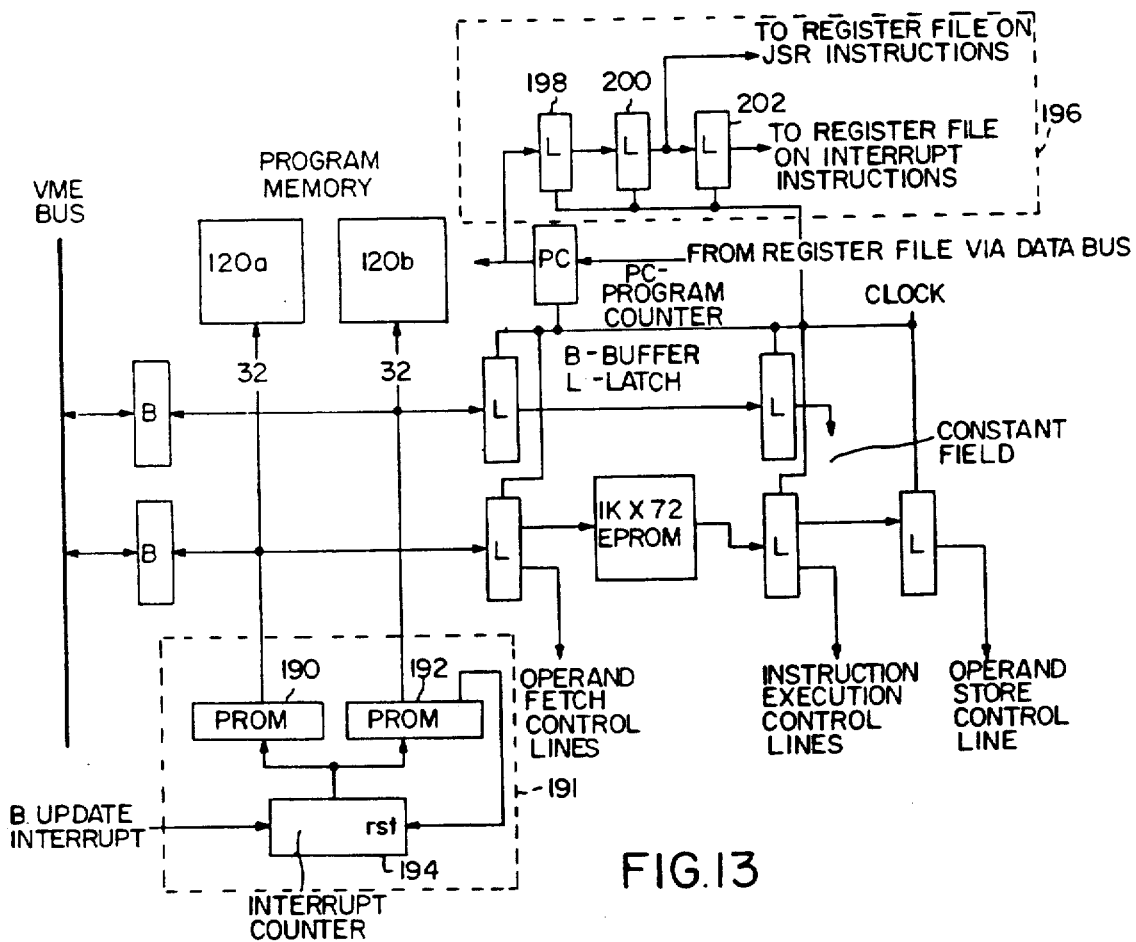
FIG. 13 shows hardware needed to support the interrupt operation involved in high-level control of the processor.

FIG. 13 shows the hardware needed to support these operations. The interrupt hardware is shown in dashed lines at 191. When an interrupt occurs, the program memory is disabled and instructions to the PIEU are supplied from PROMs 190, 192 which together contain the 64-bit interrupt instructions. A counter 194 cycles the PROMs through successive instructions, and control is returned to the program once the interrupt cycle is complete. The 8-bit PROMs and 4-bit counters are conventional discrete logic.

The hardware used for storing the program counter on JSR and interrupt instructions is shown in dashed lines at 196. This hardware includes a sequence of latches 198, 200, 202 from which different delayed versions of the program can be stored in the register file.

G. Instruction Set

The instruction set of a processor allows a user to interface with the hardware. Therefore it is essential that all of the hardware's abilities can be exploited by the instruction set. If the instructions do not allow efficient use of the hardware then either the hardware is poorly designed or the instruction set is illplanned.

The robotic processor's instructions set is programmed in firmware so it can be easily modified. Hopefully, enough control points were placed in the hardware so that the hardware can be exploited effectively. As more experience is gained in programming RIPS, most likely new instructions will be desired. Perhaps the hardware can already be properly controlled to accommodate these new instructions.

Figure 14:
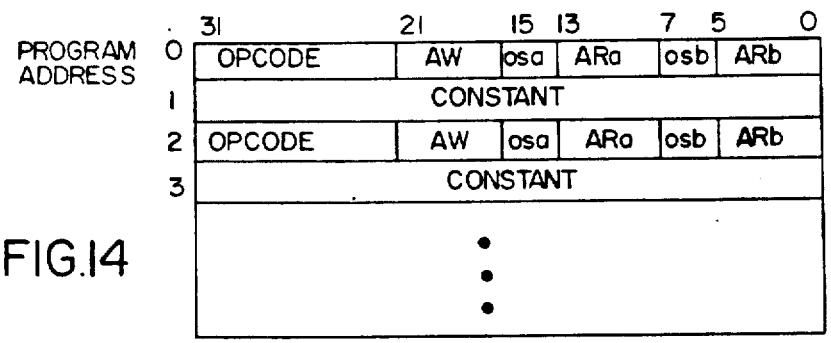
FIG. 14 illustrates the partition of a 64-bit instruction word into two 32-bit words used by the processor.
Figure 15:
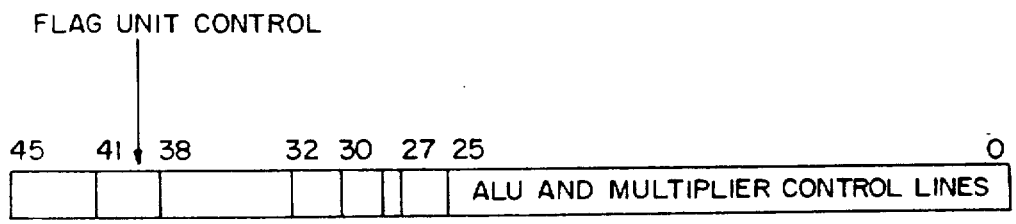
FIG. 15 shows a breakdown of the microcoded word used by the processor.
Figure 15:
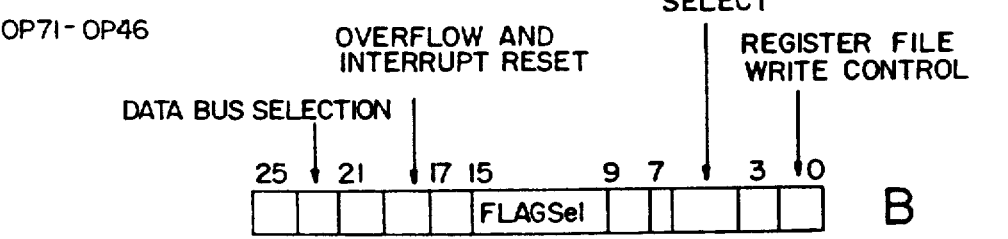

A listing of the present processor's instruction set is given in appendix B. Many powerful instructions, such as single cycle n-bit shifts and single cycle normalizing, are possible. As discussed above, each 64-bit program instruction is read by the processor as two 32-bit word, one containing execution instructions, and the other containing a constant field. FIG. 14 shows two instruction word, and the consecutive, even/odd addresses assigned to the two words in each instruction. The upper 32 bits can be further partitioned as shown in FIG. 14. The top 10 bits determine the opcode and the bottom 22 bits give the source and destination operands of the instructions.

The 10 opcode bits decoded by EPROM 132, as discussed above, to give a completely horizontal encoding of the processor's control points. In computer architecture terms, the opcode would be considered as completely vertically encoded since the 10 bit combination merely represents an address to the EPROM. After decoding, a set of 72 control bits are used to control the instruction execution process. A breakdown of the microcoded word is shown in FIGS. 15A and 15B, which show the 46-bit execution instruction (15A) and the 26-bit post execution instruction (15B) outputted by the EPROM.

The instruction set of the robotic processor provides all of the standard instructions one would expect to find in a scalar process work, plus many more specialized instructions. Note that some of the instructions use vectors as operands while others use scalars. There are also instructions which combine scalars and vectors. For example, the instruction ADD C. J, A, B adds the scalar value in $C_j$ to each of the components of vector A and stores the result in vector B.

The instruction set includes several CORDIC instructions. Since there are two CORDIC units, and each unit can perform both Rotate and Vector operations, there are a total of four CORDIC instructions. Section E discussed the intrinsic scaling problem of the CORDIC algorithm. The robotic processor solves this problem by automatically pre-multiplying the input operands with inverse of the scaling factor (1/K). Pre-multiplying allows greater precision than post-multiplying since K increases the magnitude of the final result, and an overflow occurs whenever the original operand is larger than 1/K. Once an overflow occurs, a post-multiplication cannot recover the result.

THE SECOND EMBODIMENT

FIGS. 16–21B and Table 4 describe the second embodiment of the present invention—a three dimensional vector co-processing system (3DVCP) having a three-dimensional co-processor coupled to a general-purpose processor for improving the overall speed in processing numberical computations relating to problems which are primarily three-dimensional in nature. In the following description, numerous specific details are set forth such as source and destination multiplexers, cross-bar switches, pipeline stages, instruction sets, etc. in order to provide a better understanding of the second embodiment of the present invention. It will be obvious, to one skilled in the art that the second embodiment of the present invention may be practiced without these details. In other instances, well known structures and methods have not been disclosed in detail in order not to unnecessarily obscure the second embodiment of the present invention.

Figure 16:
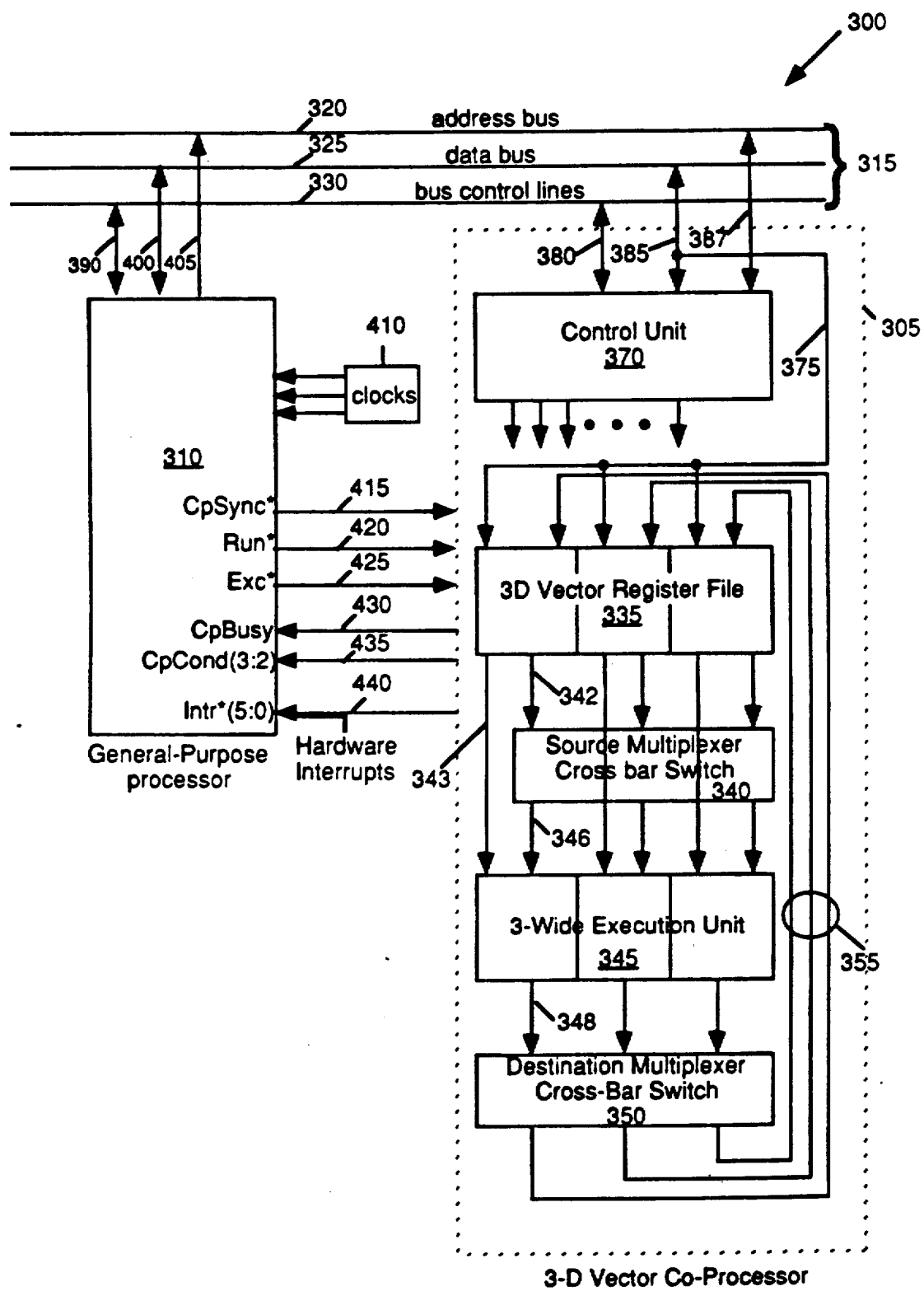
FIG. 16 is a block diagram of the three-dimensional co-processing system (3DVCP) of the second embodiment of the present invention.

Referring to FIG. 16, a block diagram illustrates the architecture of a 3DVCP suitable for use as the second embodiment of the present invention. The 3DVCP system 300 includes a three-dimensional vector co-processor 305 which communicates with a general-purpose processor 310 over a system bus 315. The system bus 315 comprises at least an address bus 320, a data bus 325 and bus control lines 330. The three-dimensional vector co-processor 305 is also coupled to the general-purpose processor 310 over a plurality of dedicated signal lines which shall be described in detail below. Just as the three-dimensional processor in the first embodiment of the present invention, the three-dimensional vector co-processor 305 has a register-to-register architecture. See, Katevenis, M.G.H., "Reduced Instruction Set Computer Architectures for VLSI, Ph.D. dissertation, University of California, Berkeley, Oct. 1983. The 3D vector register file 335 comprises three register files. Each register file has four ports—representative of which are two input ports 355 and 375 dedicated for writing and two output ports 342 and 343 for reading. The output port 343 is coupled directly to the 3-wide execution unit 345, while the output port 342 is coupled to the 3-wide execution unit 345 over the source multiplexer 340. At the same time, the input port 375 receives data operands from the data bus 325 and the data return port 355 returns selected operands from the 3-wide execution unit 345 via the destination multiplexer 350. The primary purpose of the 3D vector register file 335 is to store data operands read from the data bus 325. The 3D vector register file 335 also serves as an interface between the single-width data bus 325 and the internal 3-wide datapaths.

The control unit 370 of the three-dimensional vector co-processor 305 begins the execution of every functional instruction by fetching the source operands from the 3D vector register file 335. The control unit 370 is substantially similar to the Pipelined Instruction Evaluation Unit (PIEU) of the first embodiment of the present invention and illustrated in FIGS. 3 and 5. The source operands are written into the 3-wide execution unit 345 via three of the six possible datapaths, the representative of which are 343 and 346. The 3-wide execution unit 345 comprises three floating-point processing units (FPU's) connected in parallel for executing the desired instructions. Just as the FPU's in the first embodiment of the present invention, each FPU further comprises a multiplier logic unit (MLU) and an arithmetic logic unit (ALU). As such, each register file of the 3D vector register file 335 is coupled with its corresponding FPU of the 3-wide execution unit 345 over two data paths.

Three of the six possible output ports from the 3D vector register file 335, of which 342 is representative, are coupled to the source multiplexer 340 for providing inter-datapath operations. Inter-datapath operations are used in vector and scalar instructions, and are facilitated with a full cross-bar switch configuration of the source multiplexer 340. The outputs from the source multiplexer 340 are defined as resultant operands. The details of the full crossbar switches shall be elaborated further below. An example of an inter-datapath operation is when $A_j$ is added to $B_i$ (the sum of the i th component of vector $\vec{A}$ and the k th component of vector $\vec{B}$). Finally, the outputs from the 3-wide execution unit 345 are likewise coupled to the destination multiplexer 350 for rearranging the resultant operands before storing them in the 3D vector register file 335 over the data return lines 355. The outputs from the 3-wide execution unit 345 are defined as processed operands. Like the source multiplexer 340, the destination multiplexer 350 has a full cross-bar switch configuration to change the order of the processed operands. The outputs from the destination multiplexer 350 are defined as selected operands. The destination multiplexer is also used for scalar calculations requiring inter-datapath operations.

The datapath of the three-dimensional vector co-processor 305 is identical to the three-dimensional vector processor described in the co-pending patent application, Ser. No. 07/174,653, filed on Mar. 29, 1988. The three-dimensional vector co-processor 305 comprises a 3D vector register file 335, a source multiplexer 340, a 3-wide execution unit 345, a destination multiplexer 350 and a control unit 370. The various units of the three-dimensional vector co-processor 305 communicate over a plurality of datapaths, the representatives of which are paths 342, 343, 346, 348, 355 and 375. With the exception of the broadcast buffers and the cross-bar switches, the three-dimensional vector co-processor 305 is identical to the three-dimensional vector processor described in the first embodiment of the present invention. As such, the detailed descriptions of FIGS. 1–15 of the first embodiment of the present invention are incorporated by reference as the detailed descriptions of the three-dimensional co-processor 305 in FIGS. 16–21B of the second embodiment of the present invention.

It is provided that the broadcast buffers of the first embodiment of the present invention is not fully general since only a subset of all possible datapaths of the three-dimensional processor are supported. The arrangement of the broadcast buffers of the first embodiment of the present invention is optimal for a stand-alone three-dimensional processor performing vector and scalar calculations. In contrast, the three-dimensional co-processor 305 of the second embodiment of the present invention employs full cross-bar switches for both the source multiplexers 340 and the destination multiplexers 350. As such, the three-dimensional co-processor 305 supports all possible datapaths of the co-processor 305. This added generality allows a compiler to generate more efficient execution code for the second embodiment than that of the first embodiment of the present invention. It also follows from the efficiency in code generation that one can interface the co-processor 305 with a general-purpose processor 310 with a co-processor instruction set that is a subset of the instruction of the processor in the first embodiment of the present invention. Please refer to table 4 below and compare with appendix B.

```
A - scalar or vector register
V - only vector register
S - only scalar register
# - immediate operand
Floating-Point Operations
FCLR      A
FADD      A1, A2, A3
FADD      #, A1, A2
FADD      A1, #, A2
FSUB      A1, A2, A3
FSUB      #, A1, A2
FMUL      A1, A2, A3
FMUL      #, A1, A2
FMUL      A1, #, A2
FNEG      A1, A2
FCMP      A1, A2
FCMP      #, S1
FMULR     V1, V2, V3   mulitply followed by component rotate
FADDR     V1, V2, V3   right
FSUBR     V1, V2, V3
FMULL     V1, V2, V3   multiply followed by component rotate
FADDL     V1, V2, V3   left
FSUBL     V1, V2, V3
FRMULR    V1, V2, V3   rotate V1 right, multiply, component
FRADDR    V1, V2, V3   rotate right
FRSUBR    V1, V2, V3
FRMULL    V1, V2, V3   rotate V1 right, multiply, component
FRADDL    V1, V2, V3   rotate left
FRSUBL    V1, V2, V3
FLMULR    V1, V2, V3   rotate V1 left, multiply, component
FLADDR    V1, V2, V3   rotate right
FLSUBR    V1, V2, V3
FLMULL    V1, V2, V3   rotate V1 left, multiply, component
FLADDL    V1, V2, V3   rotate right
FLSUBL    V1, V2, V3
FRMUL     V1, V2, V3   rotate V1 right, multiply
FLADD     V1, V2, V3
FRSUB     V1, V2, V3
FLMUL     V1, V2, V3   rotate V1 left, multiply
FLADD     V1, V2, V3
FLSUL     V1, V2, V3
Shift and Rotate Operations
RTCR      V1, V2      ; rotate component right
RTCL      V1, V2      ; rotate component left
Other Operations
NOP                   ; no operation
FLFX      A1, A2      ; float to fixed
FXFL      A1, A2      ; fixed to float
RECP      A1, A2      ; take the reciprocal
```

Referring again to FIG. 16, processor 310 represents a class of general-purpose processors having open architecture. In general, open architecture processors feature a general co-processor interface to which the co-processor 305 may be coupled. Particular examples of processor to fill the role of the general-purpose processor in the second embodiment of the present invention are the MIPS and SPARC architecture. (MIPS is a trademark of Mips Technologies, Inc. and SPARC is a trademark of Sun Microsysems, Inc.). In particular, Reduced Instruction Set Computer (RISC) processors having general co-processor interfaces may be adopted in a straight forward manner to work in close cooperation with the second embodiment of the present invention to function as a three-dimensional vector co-processor.

There are two interfaces between the general-purpose processor 310 and the three-dimensional vector co-processor 305: (1) over the system bus 315 and (2) over the dedicated lines 415-440. It is common for a general-purpose processor such as a Mips RX000 processor or a SPARC integer unit used in the second embodiment of the present invention to have an I/O interface including a bus control line, a data line and an address line for communicating with a system bus coupled thereto. In a similar fashion, the general-purpose processor 310 in FIG. 16 is coupled to the system bus 315 over its I/O interface including a bus control line 390, a data bus 400 and an address line 405 for transmitting instructions and data over the corresponding lines of the system bus 315. The general-purpose processor 310 controls the address line 320 and the bus control lines 330 to read program instructions from the program memory 120 (not shown in FIG. 16 but see FIGS. 5 and 13) of the PIEU or the control unit 370. The general-purpose processor 310 also reads data from and writes data into the data memory 84 (not shown in FIG. 16 but see FIG. 2).

Synchronization for the three-dimensional vector processing system may be accomplished by configuring the general co-processor interface of the general-purpose processor in the following manner. The general-purpose processor 310 has a general co-processor interface including a plurality of ports for sending and receiving synchronization signals over the dedicated lines 415-440. The CpSync* port of the general-purpose processor 310 receives timing pulses from the clock 140, and is coupled to the clock 140 (not shown in FIG. 16 but see FIGS. 5 and 13) of the three-dimensional co-processor 305 over the line 415. Thus, the general-purpose processor 310 and the three-dimensional vector co-processor 305 are synchronized to read instructions and data from memory. The Run* port of the general-purpose processor 310 is coupled to B.RUN* (not shown in FIG. 16 but see APPENDIX C, Schematic #1, 3 of 4) of the three-dimensional vector co-processor 305 over the line 420. The general-purpose processor 310 transmits a RUN* signal to the three-dimensional vector co-processor 305 when the program instruction read is targeted for the three-dimensional vector co-processor, i.e., a floating point instruction. The Exc* port of the general-purpose processor 310 is coupled to B.RIPSRST (not shown in FIG. 16 but see APPENDIX C, Schematic #1, 3 of 4) of the three-dimensional vector co-processor 305 over the line 425. The general-purpose processor 310 transmitts an Exc* signal to abort the operation of the three-dimensional vector co-processor 305. The CpBusy port of the general-purpose processor 310 is coupled to latches 130, 134 and 136 (not shown in FIG. 16 but see FIGS. 5 and 13) of the control unit 370 over the line 430. With a CpBusy signal, the three-dimensional vector co-processor 305 informs the general-purpose processor to suspend reading additional instructions as the instructions queue of the three-dimensional vector co-processor is in progress. The CpCond (3:2) port of the general-purpose processor 310 is coupled to the condition code of the 3-wide execution unit 345 over the line 435 for sensing the condition of 3-wide execution unit. Finally, the Intr* port of the general-purpose processor 310 is coupled to the interrupt counter 194 (not shown in FIG. 16 but see FIG. 13) of the control unit 370 over the line 440 for issuing interrupt signal to the general-purpose processor 310.

Referring again to FIG. 16, it is within the contemplation of the present invention that either the system bus 315 or the dedicated lines 415-440 or a combination of both may be used to coordinate the operation of the 3DVCP. It should be understood by one skilled in the art that the number of clock and individual lines within either the system bus or the dedicated lines are for illustration purposes only and should not serve as limitation upon the present invention.

Figure 17:
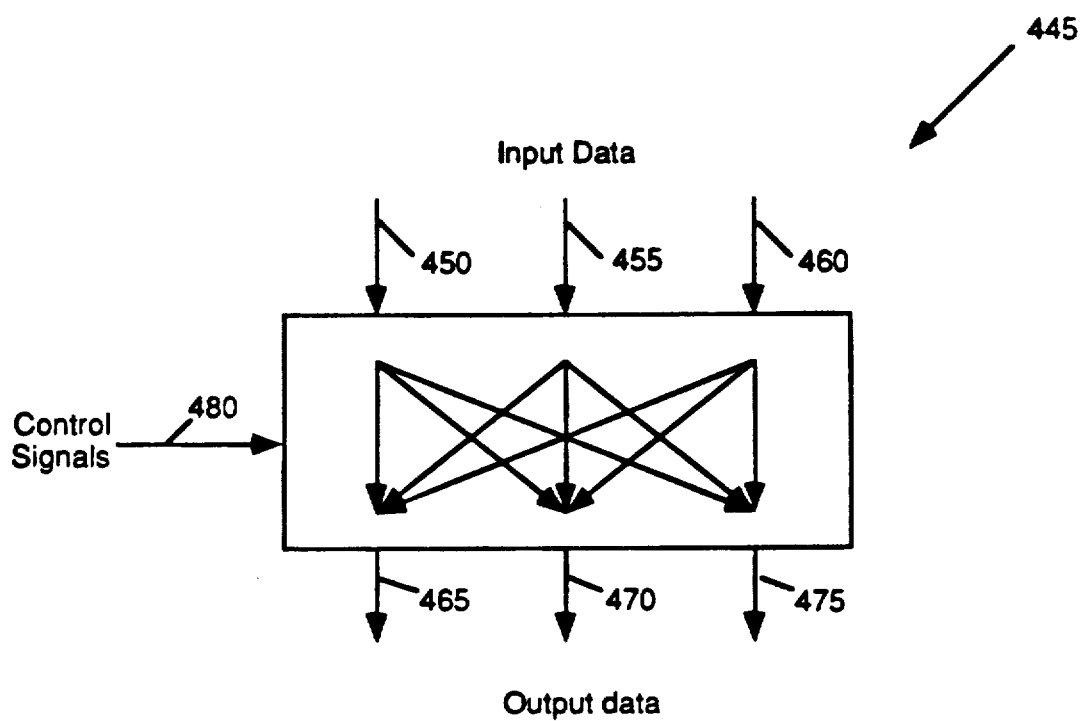
FIG. 17 is a functional block of the full cross-bar employed by the source multiplexer and destination multiplexer in the second embodiment of the present invention.
Figure 17:
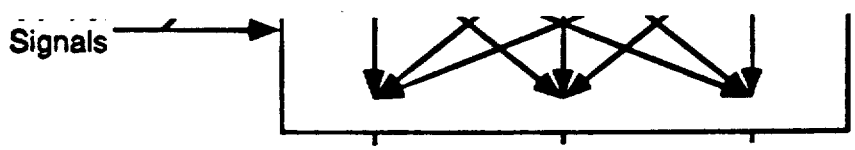

FIG. 17 is a functional block diagram of the source and destination multiplexers used in the second embodiment of the present invention. A multiplexer 445 having full cross-bar switches is shown receiving three pairs of inputs 450, 455 and 460. A cross-bar switch is a switch having a plurality of vertical paths, a plurality of horizontal paths, and control means for interconnecting any one of the vertical paths with any one of the horizontal paths. The inputs correspond to the datapaths represented by 342 and 348 in FIG. 16. Similarly, the multiplexer 445 has three pairs of outputs 465, 470 and 475. Once again, the outputs correspond to the datapaths represented by 346 and 355 in FIG. 16. The multiplexer 445 is coupled with a plurality of control signals 480 for facilitating inter-datapath operation. Control signals 480 correspond to the operand fetch control line, instruction execution control line and operand store control line (not shown in FIG. 16 but see FIGS. 5 and 13) from the control unit 370. It follows that the control signals 480 may change the order of the operands received over the input lines 450, 455 and 460 before transmitting the operands onwards over the output lines 465, 470 and 475.

Figure 18:
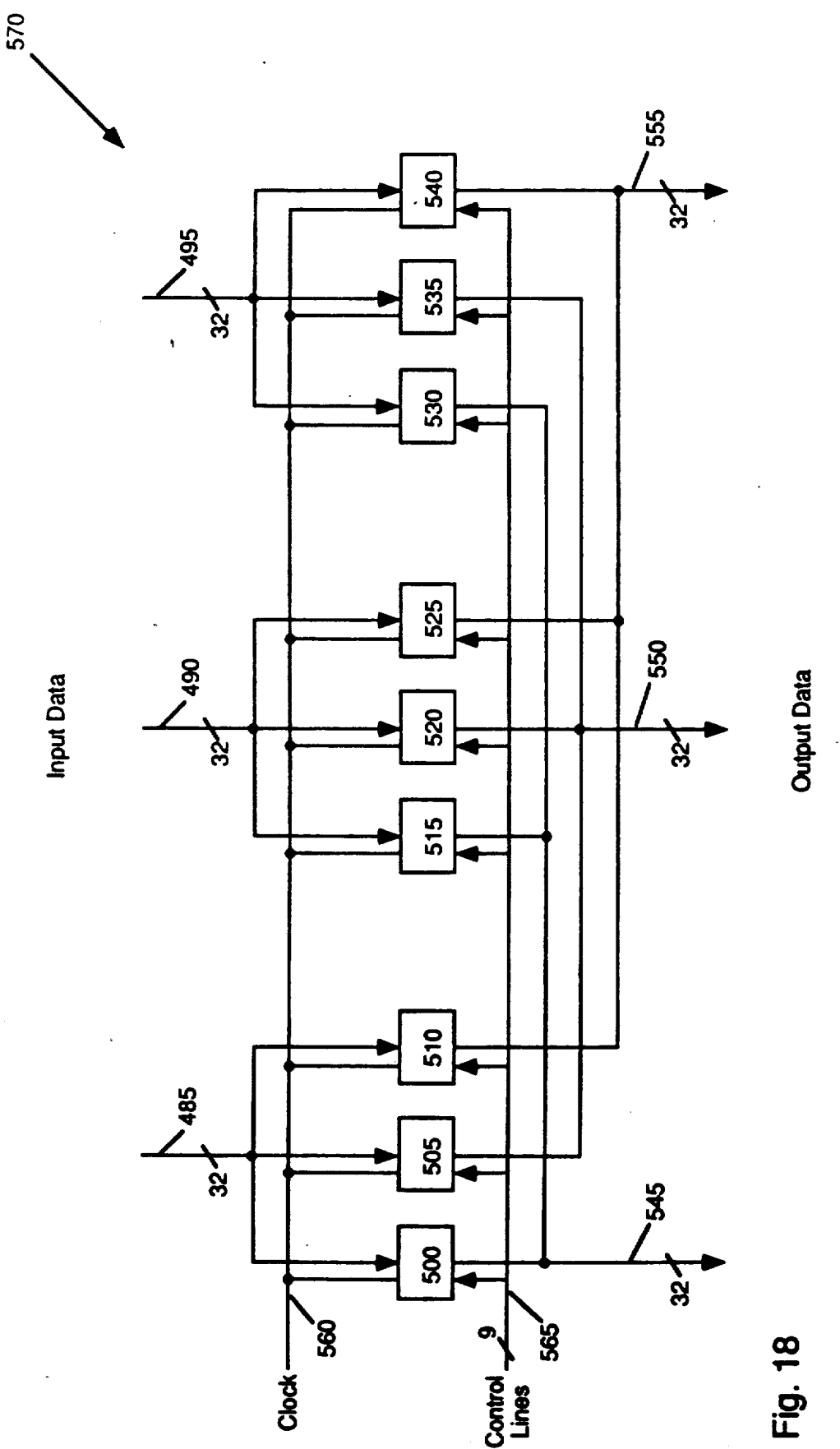
FIG. 18 is a partial view of the source and destination multiplexers of the 3DVCP being implemented in discrete elements and illustrating the source or destination multiplexers in a full cross-bar switch configuration in the second embodiment of the present invention.

FIG. 18 shows an implementation with discrete circuit elements of the source and destination multiplexers used in the second embodiment of the present invention. A multiplexer 570 is shown having a plurality of latches 500-540. In the second embodiment of the invention, the popular latch 74S74 which is an octal D register with positive clock edge and tri-state outputs may fill the role of the source and destination multiplexers. Alternatively, the off-the-shelf buffer 74244 which also has tri-state outputs may be substituted for the latch 74S74. The advantage of using latches over buffers is that the circuit 570 functions both as a multiplexer and a pipeline stage. Referring again to FIG. 18, the latches 500-540 receives inputs from three pairs of data inputs lines 485, 490 and 495. At the same time, the clock signal lines of the latches are tied to the clock 140 (not shown in FIG. 18 but see FIGS. 5 and 13) of the control unit 370 over the line 560 for snychronizing the execution of the pipeline stages. The control lines 565 control the actual ordering of the operands between the lines 485, 490, 495 and the lines 545, 550 and 555. The outputs from each of the latches 500-540 are coupled in a full cross-bar switch configuration. As such, the multiplexer 570 may alter the order of the operands received over the input lines 485, 490 and 495 before transmitting the operands onwards over the output lines 545, 550 and 555.

Figure 19:
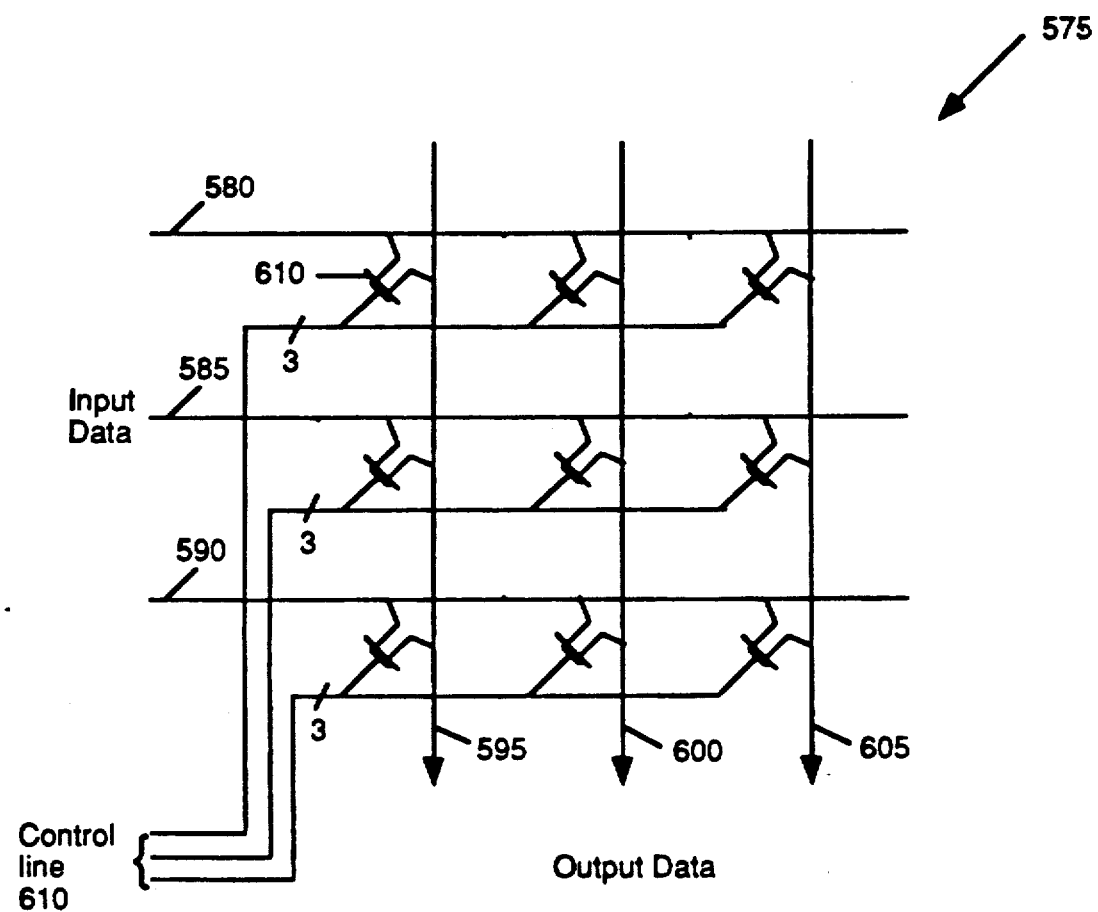
FIG. 19 is a partial view of the three-dimensional vector co-processor being implemented on a single chip and illustrating the use of steering logic and pass transistors to implement the source of destination multiplexer in a full cross-bar switch configuration in the second embodiment of the present invention.

FIG. 19 is a partial view of the source and destination multiplexers of the three-dimensional vector co-processor being implemented on a single chip in the second embodiment of the present invention. A multiplexer 575 is shown having three horizontal input data paths 580, 585 and 590 as well as three vertical output data paths 595, 600 and 605. The horizontal data paths and vertical data paths are not connected at their respective intersections, but are coupled to the drain and source of a plurality of pass transistors, of which transistor 610 is representative. The gates of pass transistors 610 are coupled to a 9-wide control line 610 for implementing steering logic, allowing signals to propagate from the horizontal input data paths to the vertical output data paths. It should be understood by one skilled in the art that the steering logic implementation of the multiplexer 575 in FIG. 19 is equivalent to full cross-bar switches implemented in discrete circuit elements of the multiplexer 570 in FIG. 18.

By way of examples, One of the most common three-dimensional geometric operations is the vector cross product. A cross product is used to calculate the derivative of a vector in a moving coordinate frame, for example. In order to computer $\vec{R}3 = \vec{R}1 \times \vec{R}2$ we would need to evaluate the following equations:

$$R3_i = R1_j R2_k - R1_k R2_j$$

$$R3_j = R1_k R2_i - R1_i R2_k$$

$$R3_k = R1_i R2_j - R1_j R2_i$$

The 3DVCP computes these operation with the following four assembly language instructions:

| | | |
|---|---|---|
| FRMULR | R1, R2, R3 | ; rotate source vector R1 right 1 component, |
| | | ; floating-point vector multiply with R2, |
| | | ; rotate result right 1 component and store in R3 |
| FLMULL | R1, R2, R4 | ; rotate source vector R1 left 1 component, |
| | | ; floating-point vector multiply with R2, |
| | | ; rotate result left 1 component and store in R4 |
| NOP | | ; no operation, pipeline dependance |
| FSUB | R3, R4, R3 | ; floating-point vector subtract of R4 |
| | | ; from R3 with the result stored in R3 |

Note that the above rotates are vector component rotates (i.e. for a right rotate: the ith vector component rotates into the jth position, the jth vector component rotates into the kth position, and the kth vector component rotates into the ith position). The first instruction computes the first 3 partial products of R3j, R3j, and R3k ands stores the result in vector register R3. The second instruction computes the second 3 partial products and stores the results in a temporary vector to register R4. The source and destination multiplexers are used to combine vector components appropriately. The third instruction, a no-operation, is necessary because of the pipeline dependency created by R4 which is created in the second instruction and used in the fourth instruction. Finally, the fourth instruction subtracts the two sets of partial products and stores the answers in R3. Since the 3DVCP completes one instruction every cycle, a floating-point vector cross product executes in 3 cycles. Another cycle is needed before the result of the cross products is available for further calculations.

Another common 3-dimensional operation is a vector rotation. A vector rotation is generally accomplished by multiplying a vector with a rotation matrix as show below:

$$\begin{bmatrix} n_i & o_i & a_i \\ n_j & o_j & a_j \\ n_k & o_k & a_k \end{bmatrix} \begin{bmatrix} t_i \\ t_j \\ t_k \end{bmatrix} = \begin{bmatrix} s_i \\ s_j \\ s_k \end{bmatrix}$$

The figure below lists the assembly instruction sequence that the 3DP performs to calculate a matrix-vector multiply. The rotational matrix columns, n, o, and a are stored in vector registers R1, R2, and R3, and the vector to be rotated, t, is stored in R4. The final result, s, is placed in R5.

| | | |
|---|---|---|
| FMUL | R1, R4.i, R1 | ; vector-scalar floating-point multiply |
| FMUL | R2, R4.j, R2 | ; vector-scalar floating-point multiply |
| FMUL | R3, R4.k, R3 | ; vector scalar floating-point multiply |
| FADD | R1, R2, R2 | ; vector addition |
| NOP | | ; no operation, pipeline dependency |
| FADD | R2, R3, R5 | ; vector addition |

A matrix-vector multiply takes 5 cycles for the 3DVCP to execute. Note that the first 3 instructions are scalar-vector multiply instructions. A vector computation can be generalized to a homogeneous transformation by augmenting the above sequence with a single vector addition. Hense, homogeneous transformations are performed in 6 clock cycles on 3DVCP (assuming a unity scaling factor).

Figure 20:
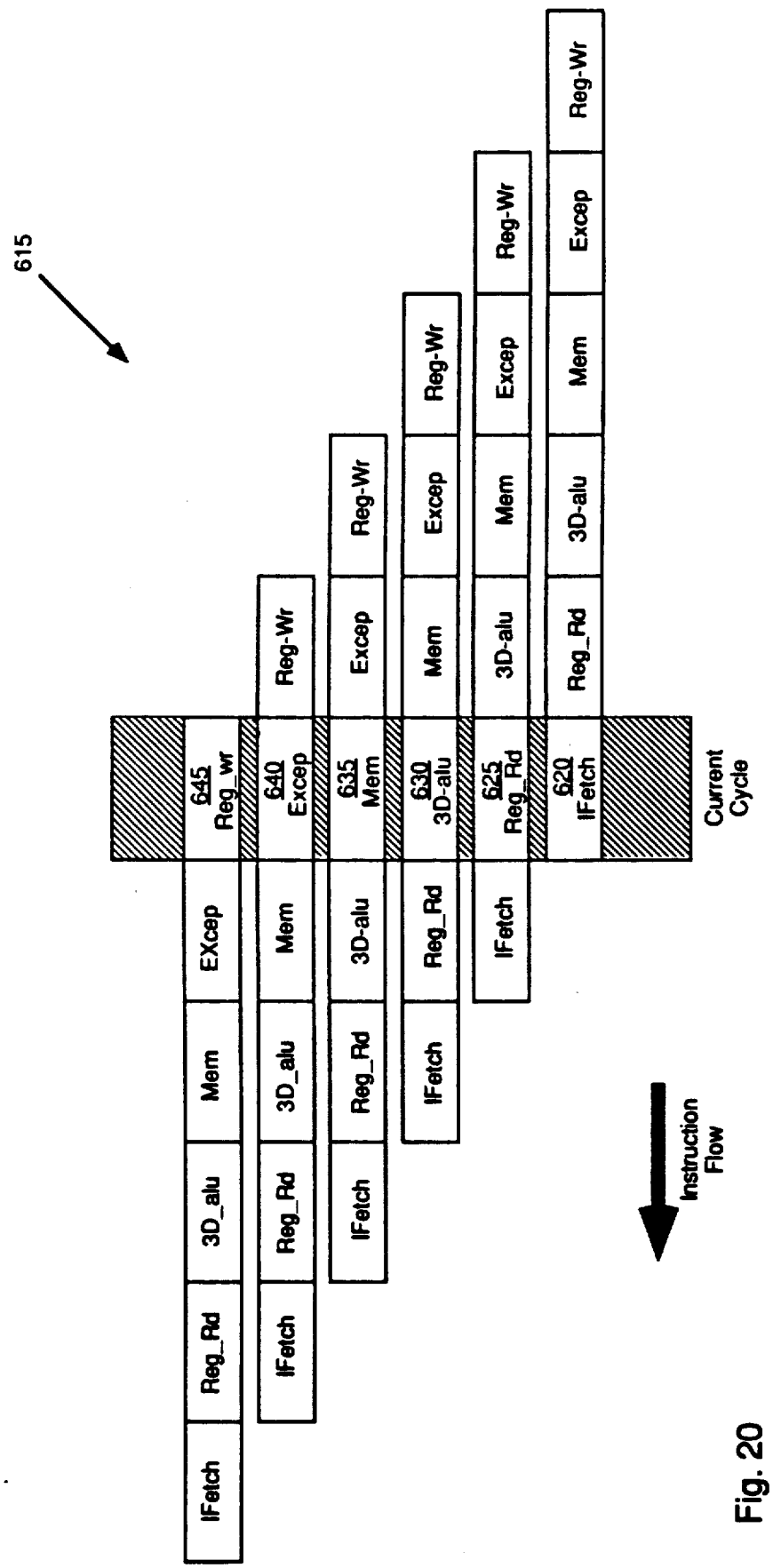
FIG. 20 is a timing diagram illustrating a possible pipeline of the three-dimensional vector co-processor in the second embodiment of the present invention.

FIG. 20 shows a pipeline of the three-dimensional vector co-processor 305 of the second embodiment of the present invention. The timing diagram 615 is a snap shot of a possible pipeline of the three-dimensional vector co-processor 305 as it works in close cooperation with a general-purpose processor 310 such as the Mips processor. Just as the vector processor has four stages in its pipeline in the first embodiment of the present invention, the pipeline in 615 has an instruction fetch stage 620, operand fetch (Reg_Rd) 625, instruction execute (3D_alu) 630 and operand store (Reg_wr) 645. In addition, the pipeline in the second embodiment of the present invention allows two optional stages—Mem 635 and Excep 640—to accommodate the slower general-purpose processor. During the Mem stage 635, data is read from the system bus 315 when the instruction is either a Load or Store for the three-dimensional vector co-processor. Moreover, during the Excep stage 640, interrupt signal for the general-purpose processor 310 is also transmitted to the three-dimensional vector processor 305.

Figure 21A:
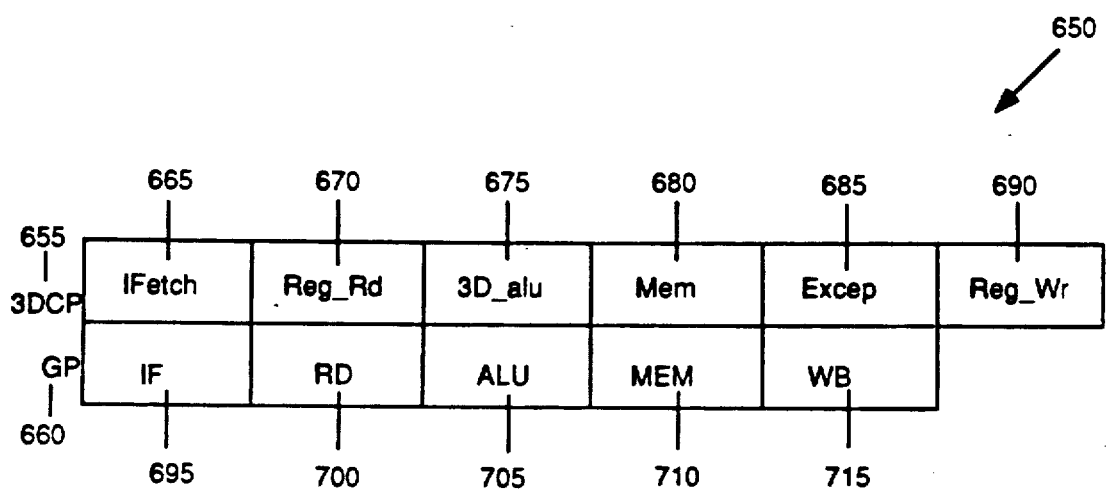
FIG. 21A is a diagram showing possible pipeline stages of the three-dimensional vector co-processor and that of a general-purpose processor.

FIG. 21A shows a possible pipeline of a three-dimensional vector co-processor and a general-purpose processor. The three-dimensional vector co-processor has an optional six-stage pipeline 655 having instruction fetch 665, operand fetch (Reg_Rd) 670, instruction execute (3D_alu) 675, Mem 680, Excep 685 and operand store (Reg_wr) 690. Meanwhile, the general-purpose processor has a five-stage pipeline 660 including instruction fetch 695, operand fetch (RD) 700, instruction execute (ALU), MEM 710 and operand store (WB) 715.

FIG. 21B is stage occupancy diagram illustrating the 3DVCP. Two types of instructions are executed: those for the general-purpose processor (lower case instructions) and those for the three-dimensional processor (upper case instructions). Referring again to FIG. 21B, for Iwc2—the instruction to load a word into the co-processor—the general-purpose processor 310 and the three-dimensional vector co-processor 305 fetch the instruction in cycle 0. Since Iwc2 is a general-purpose instruction, the three-dimensional vector co-processor ignores the instruction until the general-purpose processor 310 completes the execution of the instruction in cycle 3. As the diagram 720 indicates, the three-dimensional co-processor 305 loads the word into its memory after the general-purpose processor 310 returns the resultant operand in cycle 3. In contrast, for FADD—the instruction to add two vectors in the co-processor—the three-dimensional vector co-processor 305 processes the addition function through its datapath in diagram 725. Note that co-processor 305 does not utilize the Mem and Excep stages because they are not required for FADD. The general-purpose processor 310 ignores the FADD instruction after it fetches the instruction in cycle 1. Diagram 730 illustrates the execution of add-instruction to add two registers in the general-purpose processor—where the general-purpose processor 310 uses each stage of its five-cycle pipeline to process the addition function and the three-dimensional vector co-processor 305 ignores the same instruction after fetching it in cycle 2. On the other hand, diagram 735 illustrates the execution of FRMULR-instruction to multiply two vector registers. Shown in cycle 3, the general-purpose and co-processor fetch the instruction. Because FRMULR is a co-processor instruction, the general-purpose processor ignores the instruction and the three-dimensional vector co-processor executes the same. Finally, in diagram 740, the execution of Iwc2 is repeated.

FIG. 21B illustrates that by configuring the source and destination multiplexers of the three-dimensional vector co-processor as full cross-bar switches, the 3DVCP implements a division of labor where the general-purpose processor 310 processes general-purpose instructions and the three-dimensional vector co-processors specializes in floating point instructions. Because the full cross-bar switches pass operands into any datapaths coupled to the source and destination multiplexers, the compiler needs not worry about special conditions as encountered in prior art processor architectures. As such, code generation under the second embodiment of the present invention is very efficient, thus increasing several fold the overall speed of executing 3-D algorithms.

Appendices

The following Appendices referred to above are included in U.S. Pat. No. 5,019,968, hereby incorporated by reference.

1. Appendix A, showing instruction execution formats.
2. Appendix B, showing the instruction set for the processor, as it functions in a robotics control system.
3. Appendix C, with Schematics 1, 2, and 3. Schematic 1 is a schematic diagram for the three execution units in the processor, the flag unit, and the program counter. Schematic 2 is a schematic for the portion of the processor in FIG. 3 shown above the data bus. Schematic 3 is a schematic diagram of the portion of the FIG. 3 processor below the dat bus in the figure, but without the flag unit and program counter (shown in Schematic 1).

While the present invention has been particularly described with reference to FIGS. 1-21B and with emphasis on certain processors and multiplexers, it should be understood that the figures are for illustration purposes only and should not be taken as limitations upon the invention. It is within the contemplation of the present invention that broadcast buffers and other cross-bar switches may be employed individually or in combination to achieve substantially similar interface between a co-processor and a general-purpose processor with less efficient code. It is contemplated that many other changes and modications may be made, by one of ordinary skill in the art, without departing from the spirit and scope of the invention as disclosed above.

We claim:

1. A processor capable of receiving and execution a series of instructions provided from a memory, for carrying out vector/vector and scalar/vector arithmetic operations, comprising.
   a. a data transfer input for receiving the series of program instructions and data from the memory;
   b. I, J, and K register files coupled to said said data transfer input for receiving operands therefrom, each containing a plurality of registers for storing scalar values for the three scalar components of three-dimensional vectors,
   c. I, J, and K execution units coupled to said I, J, and K register files for performing arithmetic operations on operands placed in the execution units,
   d. I, J, and K operand pathways connecting each I, J, and K register file, respectively, with the corresponding I, J, and K execution unit, for transferring operands stored in selected register locations to the corresponding execution units, in response to data-fetch commands carried in the program instructions,
   e. first and second broadcast buffers connecting first and second pairs of operand pathways for passing operands between the two pathways in each pair of said operand pathways, in response to pathway exchange commands carried in the program instructions,
   f. data-return means coupled to said I, J, and K execution unit and said I, J, and K register files for returning operands from the execution units to selected locations in the register files, in response to write-to-register commands in the program instruction,
   g. a data-transfer output for passing selected operands from the processor to the memory, in response to write-to-memory commands carried in the program instruction, and
   h. a program evaluation unit coupled to said I, J, and K register files for passing commands in the program instructions to the register files, the execution units, the broadcast buffers, the data-return means, and the data-transfer input and output.

2. The processor of claim 1, wherein each execution unit includes an arithmetic logic unit and a multiplication unit.

3. The processor of claim 2, wherein each operand pathway includes first and second latches, first and second data buses connecting the I, J, and K registers with the first and second latches, respectively, a third data bus connecting the first latch with the corresponding arithmetic logic unit and multiplication unit, and a fourth data bus connecting the second latch with the multiplication unit.

4. The processor of claim 2, which further includes, for each execution unit, multiplexing means for directing the contents of the second latch or a constant value from the program evaluation unit to the associated arithmetic unit, in response to commands in the program instructions.

5. The processor of claim 4, wherein said multiplexing means includes a third latch for staging the contents of the second latch, and the contents of each of the third latches can be transferred to memory.

6. The processor of claim 1, where in the data return means includes multiplexing means associated with the execution units for writing the results of the execution units into selected register file locations.

7. The processor of claim 1, which further includes a CORDIC algorithm successive-add unit which implements two-dimensional coordinate rotations, using operands obtained from the three register files, and said shift-and-add unit includes latches for storing the output values of the algorithm operation, for use as operands in subsequent program instructions.

8. The processor of claim 1, wherein the program instructions are pipelined from the program evaluation unit in fetch-operand, execute, and store-result stages.

9. The processor of claim 8, wherein the processor clock speed is less than 100 nsec.

10. A processor capable of acting on a series of program instructions for carrying out vector/scalar, and scalar/vector arithmetic operations on three-dimensional vectors and scalar/scalar arithmetic operations, comprising
   a. a memory for storing the program instructions and data and for storing the results of arithmetic operations performed in accordance with the program instructions,
   b. a data-transfer input coupled to said memory for receiving the series of program instructions and data from the memory,
   c. I, J, and K register files coupled to said data-transfer input for receiving operands therefrom, each containing a plurality of registers for storing scalar values for the three vectors components of three-dimensional vectors,
   d. I, J, and K execution units coupled to said I, J, and K register files for performing arithmetic operations on operands placed in the execution units,
   e. I, J, and K operand pathways connecting each I, J, and K register file, respectively, with the corresponding I, J, and K execution unit, for transferring operands stored in selected register locations to the corresponding execution units, in response to data-fetch commands carried in the program instructions,
   f. first and second broadcast buffers connecting first and second parts of operand pathways, for passing operands between the two pathways in each pair, in response to pathway exchange commands carried in the program instructions,
   g. data-return means for returning operands from the execution units to selected locations in the register files, in response to write-to-register commands in the program instruction,
   h. a data-transfer output for passing selected operands to the memory, in response to write-to-memory commands carried in the program memory, and i. a program evaluation unit coupled to said I, J, and K register files for passing commands in the program instructions to the register files, the execution units, the broadcast buffers, the data-return means, and the data-transfer input and output.

11. The processor of claim 10, wherein the memory includes a program memory for storing program instructions, and a data memory for storing operands needed for program execution.

12. The processor of claim 10, for use in a robotics control device for calculating kinematic and dynamic solutions needed to control robotic motion.

13. The processor of claim 12, where in the calculations involving performing vector cross product, vector addition, scalar/vector multiplication, and scalar addition calculations.

14. The processor of claim 13, wherein the calculations further include vector rotation and trigonometric function calculations, and the processor further includes a CORDIC algorithm successive-add unit which implements two-dimensional coordinate rotations, using operands obtained from the three register files, and said successive-add unit includes latches for storing the output values of the algorithm operation for use in subsequent program instructions.

15. A three-dimensional vector processing system for accelerating the computation of 3-D calculations without impairing the performance of other general-purpose operations, said system comprising:
  a system bus for carrying address, data, and control information;
  a general-purpose processor having an I/O interface coupled to said system bus and a general co-processor interface;
  a memory coupled to said system bus, said memory storing a series of program instructions and data;
  a co-processor coupled to said general-purpose processor and to said memory over said system bus for reading and processing said instructions and data under the control of said general-purpose processor, said co-processor further being coupled to said general-purpose processor over said general co-processor interface for synchronizing the execution of instructions targeted for said general-purpose processor and said co-processor, said co-processor further including:
  a. a data transfer input for receiving said series of program instructions and data from the memory;
  b. I, J and K register files coupled to said data transfer input for storing scalar values for the three scalar components of three-dimensional vectors in a plurality of registers;
  c. a source multiplexer coupled to said I, J and K register files for receiving operands therefrom;
  d. I, J and K execution units coupled to said source multiplexer for receiving resultant operands therefrom, said I, J and K execution units performing arithmetic and logical operations on said resultant operands stored in said execution unit;
  e. I, J and K operand pathways connecting each I, J and K register file, respectively, with the corresponding I, J and K execution unit, for transferring operands stored in selected register locations to the corresponding execution units, in response to data-fetch commands carried in the program instructions;
  f. a destination multiplexer coupled to said I, J, and K execution units for receiving processed operands therefrom, said destination multiplexer further changing the order of said processed operands, said destination multiplexer outputting selected operands;
  g. data-return means coupled to said destination multiplexer for receiving said selected operands therefrom, said data-return means further returning said selected operands to selected locations in said register files in response to receiving write-to-register commands in the program instruction,
  h. a data-transfer output coupled to said I, J and K register files for passing selected operands from the co-processor to the memory, in response to write-to-memory commands carried in the program instruction, and
  i. a control unit coupled between said system bus and said I, J and K register file for passing commands in said program instructions to said register files, said execution units, said source and destination multiplexers, said data-return means, and said data-transfer input and output.

16. The processing system of claim 15, wherein each execution unit includes an arithmetic logic unit and a multiplication unit.

17. The processing system of claim 15, wherein said source multiplexer is configured as a full cross-bar switch for directing the contents of said I, J and K register file or a constant value from said control unit to the associated arithmetic unit, in response to commands in the program instructions.

18. The processing system of claim 15, wherein said destination multiplexer is configured as a full cross-bar switch for changing the order of said processed operands before transmitting said selected operands to said I, J and K register file over said data return means.

19. The processing system of claim 15 further comprising a program evaluation unit wherein the program instructions are pipelined from the program evaluation unit in instruction fetch, fetch-operand, instruction execute, and store-result stages.

* * * * *

UNITED STATES PATENT AND TRADEMARK OFFICE
CERTIFICATE OF CORRECTION

PATENT NO. : 5,187,796
DATED : February 16, 1993
INVENTOR(S) : Yulun Wang, Partha Srinivasan It is certified that error appears in the above-indentified patent and that said Letters Patent is hereby corrected as shown below:

Column 1, line 5, insert the following: This invention was made with Government support under Contract NAS7-1086 awarded by NASA. The Government has certain rights in this invention.

Signed and Sealed this

Fourth Day of January, 1994

Attest:

BRUCE LEHMAN

*Attesting Officer*  Commissioner of Patents and Trademarks